United States Patent [19]

Meininger et al.

[11] Patent Number: 4,622,390
[45] Date of Patent: Nov. 11, 1986

[54] WATER-SOLUBLE DISAZO COMPOUNDS CONTAINING AN AMINO NAPHTHOL-DISULFONIC ACID MOIETY AS A COUPLING COMPONENT AND FIBRE-REACTIVE GROUPS

[75] Inventors: Fritz Meininger; Ernst Hoyer, both of Frankfurt am Main; Joachim W. Otten, deceased, late of Offenbach am Main; by Ursula Otten, heir, Heidelberg; by Anna G. Rudolph née Otten, heir, Dillenburg; Rudolf Fass, Kelkheim, all of Fed. Rep. of Germany

[73] Assignee: Hoechst Aktiengesellschaft, Frankfurt, Fed. Rep. of Germany

[21] Appl. No.: 774,171

[22] Filed: Sep. 9, 1985

Related U.S. Application Data

[63] Continuation of Ser. No. 299,342, Sep. 4, 1981, abandoned.

[30] Foreign Application Priority Data

Sep. 6, 1980 [DE] Fed. Rep. of Germany ....... 3033611

[51] Int. Cl.$^4$ .................... C09B 62/09; C09B 62/453; C09B 62/533; D06P 1/382
[52] U.S. Cl. .................................. 534/634; 534/582; 534/598; 534/617; 534/637; 534/642
[58] Field of Search ............... 534/634, 637, 638, 624, 534/625, 642, 617

[56] References Cited

U.S. PATENT DOCUMENTS

| | | | |
|---|---|---|---|
| 3,429,870 | 2/1969 | Carati et al. | 534/634 X |
| 4,314,818 | 2/1982 | Courtin | 534/634 X |
| 4,412,948 | 11/1983 | Omura et al. | 534/634 |
| 4,425,270 | 1/1984 | Yamada et al. | 534/634 |

FOREIGN PATENT DOCUMENTS

| | | | |
|---|---|---|---|
| 2740152 | 3/1978 | Fed. Rep. of Germany | 534/634 |
| 53-117024 | 10/1978 | Japan | 534/634 |
| 1013442 | 12/1965 | United Kingdom | 534/634 X |
| 1031488 | 6/1966 | United Kingdom | 534/634 X |
| 1583387 | 1/1981 | United Kingdom | 534/634 |

OTHER PUBLICATIONS

Research Disclosure, No. 15209, p. 6 (12-1976).

*Primary Examiner*—Floyd D. Higel
*Attorney, Agent, or Firm*—Curtis, Morris & Safford

[57] ABSTRACT

Water-soluble disazo dyestuffs of the formula

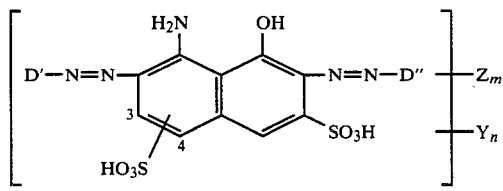

which contain a 1-amino-8-naphthol-3,6- or -4,6-disulfonic acid moiety as a bivalent coupling component and which contain diazo components with fibre-reactive groups characterized by the inclusion of one or two chloro-triazinyl groups and one or two of the six groups defined by the substituent Z, namely, $$-SO_2-CH_2-CH_2-OSO_3H; \quad -\underset{R}{N}-SO_2-CH_2-CH_2-OSO_3H;$$

$$-CH_2-SO_2-CH_2-CH_2-OSO_3H; \quad -SO_2-CH=CH_2;$$

$$-\underset{R}{N}-SO_2-CH=CH_2; \text{ or } -CH_2-SO_2-CH=CH_2,$$

each of which are connected to the benzene moiety of the diazo component; the chloro-triazinyl group is further substituted by a substituted or unsubstituted phenylamino or substituted or unsubstituted naphthylamino group, a substitutent of which may be one of the six groups defined by the Z substituent; if there is only one chloro-triazinyl group in the compound, then the diazo component is also substituted by one of the Z substituents; these compounds are dyestuffs which exhibit a good fixation degree of the dyestuffs in fabrics.

13 Claims, No Drawings

WATER-SOLUBLE DISAZO COMPOUNDS CONTAINING AN AMINO NAPHTHOL-DISULFONIC ACID MOIETY AS A COUPLING COMPONENT AND FIBRE-REACTIVE GROUPS

This application is a continuation of application Ser. No. 299,342, filed Sept. 4, 1981, now abandoned.

The present invention relates to new water-soluble disazo compounds which, in the form of the free acid, have the general formula (1)

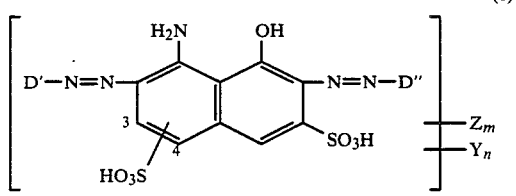

These new compounds can be in the form of the free acid and in the form of their salts. They are preferably in the form of their salts, particularly the salts of the alkali metals and the alkaline earth metals; particularly preferred salts are sodium salts, potassium salts and also calcium salts. They are used, preferably in the form of their alkali metal salts, for the dyeing of materials made preferably of fibers.

The formula moieties of the above formula (1) have the following meaning: D′ is a phenyl radical or a naphthyl radical, which are substituted by a group of the formula moiety Y or the formula moiety Z, defined below, and can be additionally substituted by one or two substituents from the group comprising sulfo, chlorine, bromine, lower alkyl, such as ethyl and particularly methyl, and lower alkoxy, such as ethoxy and in particular methoxy; D″ is a phenyl radical or a naphthyl radical, which are substituted by a group of the formula moiety Y or the formula moiety Z, defined below, and can be additionally substituted by one or two substituents from the group comprising sulfo, chlorine, bromine, lower alkyl, such as ethyl and in particular methyl, and lower alkoxy, such as ethoxy and in particular methoxy; D′ and D″ can be identical with one another or different from one another; one sulfo group in the disulfo-1-amino-8-hydroxynaphthylene radical is in the 3- or 4-position of this naphthalene radical; Z is a group of the formula (2a), (2b), (2c), (2d), (2e) or (2f)

$$-SO_2-CH_2-CH_2-X \quad (2a)$$

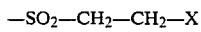
(2b)

$$-CH_2-SO_2-CH_2-CH_2-X \quad (2c)$$

$$-SO_2-CH=CH_2 \quad (2d)$$

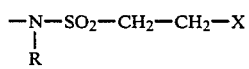
(2e)

$$-CH_2-SO_2-CH=CH_2 \quad (2f)$$

in which R is an alkyl group having 1 to 4 C atoms, preferably the methyl group, and X is a chlorine atom or the acetoxy group or the thiosulfato group of the formula $-S-SO_3H$ (in the form of the free acid) or the phosphato group of the formula $-O-PO_3H_2$ (in the form of the free acid) or preferably the sulfato group of the formula $-OSO_3H$ (in the form of the free acid); Y is a radical of the formula (3)

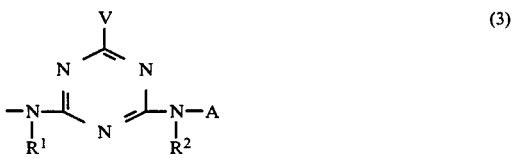

in which: $R^1$ is a hydrogen atom or an alkyl group having 1 to 4 C atoms; $R^2$ is a hydrogen atom or an alkyl group having 1 to 4 C atoms, and $R^1$ or $R^2$ can be identical to one another or different from one another; V is the chlorine or bromine atom; A is a hydrogen atom or an alkyl group having 1 to 6 C atoms, which group can be substituted, for example, by one or two substituents from the group comprising methoxy, ethoxy, hydroxy, acetoxy, phosphato, sulfato, sulfo, carboxy, phenyl and sulfophenyl, or is a phenyl radical which can be substituted by a substituent from the group comprising methyl, ethyl, methoxy, ethoxy, chlorine, bromine, carboxy, sulfo, carbamoyl and sulfamoyl, or is a radical of the formula (4)

$$-B-Z \quad (4)$$

in which: B is a phenylene radical or a naphthylene radical, which can be substituted by one or two substituents, chosen from the set comprising one sulfo group, one chlorine atom, one or two methyl and ethyl groups and one or two methoxy groups and ethoxy groups, and Z has the abovementioned meaning; m is the number zero or 1 and n is the number 1 or 2, and the sum (m+n) is equal to 2, and the compound of the formula (1) must necessarily contain at least two of the radicals possible in the molecule, corresponding to the formulae (2a) to (2f) defined above, and to the following formula (5)

where V has the abovementioned meaning.

The term "lower" indicates here, as in the following text, that in a radical (or compound) so described the aliphatic radical preferably is one having 1 to 4 C atoms.

The present invention further relates to a process for the preparation of the new disazo compounds of the general formula (1), wherein 1-amino-8-naphthol-3,6-disulfonic acid or 1-amino-8-naphthol-4,6-disulfonic acid is reacted in equimolar amounts in the moderately to strongly acidic range, preferably at a pH value of between 0.5 and 4.5 and at a temperature of between 0° and 25° C., with a diazonium compound of an amine of the general formula (6)

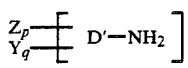 (6)

in which D', Z and Y have the abovementioned meanings and p and q each represents the number zero or 1, and is subsequently reacted in the slightly acidic to slightly alkaline range, preferably at a pH of between 4.5 and 8.0 and at a temperature of between 0° and 30° C., with a diazonium compound of an amine of the general formula (7)

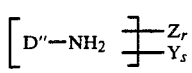 (7)

in which D", Z and Y have the abovementioned meaning and r and s each represents the number zero or 1, the first diazonium compound being coupled in the o-position relative to the amino group of the aminonaphthol to form the monoazo compound, and the second diazonium compound being introduced in the o-position relative to the hydroxy group of the monoazo compound formed, the amines of the general formulae (6) and (7) being chosen so that the sum of (p+q) is equal to 1, the sum of (r+s) is equal to 1, the sum of (p+r) is equal to zero or 1 and the sum of (q+s) is equal to 1 or 2. In the diazo components of the general formulae (6) and (7), the formula moieties D', D", Z and Y can be identical to one another or different from one another and the formulae moieties $R^1$ and $R^2$ can be identical to one another or different from one another in one and the same amino compound. Furthemore, the radical Z which may ultimately be present in Y can be different from the radical Z which may ultimately be present linked directly to D' or D". The two amines used in the preparation of the disazo compounds according to the invention can thus have either the identical structure or structures different from one another.

Aromatic amines of the general formula (6) and of the general formula (7), in which q is equal to zero or s is equal to zero, have been described, for example, in German Patent Specifications 1,278,041, 1,276,842, 1,150,163, 1,126,542 and 1,153,029 and in German Offenlegungsschriften 2,154,943, 2,100,080, 2,034,591 and 1,943,904 and in German Auslegeschrift 1,204,666.

Aromatic amines of the general formula (6) and of the general formula (7), in which p is equal to zero or r is equal to zero, can be prepared, for example analogously to the method described in German Patent Specification 485,185, by reacting a corresponding amino compound with cyanuric chloride or cyanuric bromide and subsequently reacting the product obtained with a diaminobenzene or diaminonphthalene compound of the formula $R^1$-NH-D'-$NH_2$ or $R^1$-ND-D"-$NH_2$ in a second condensation reaction.

The diazotization of the amines of the general formulae (6) and (7) is carried out in a known and customary manner, familiar to a man skilled in the art, for example by using nitrous acid (alkali metal nitrite and a strong acid), nitrosylsulfuric acid or a lower alkyl nitrite.

The coupling reaction of the diazotized amine of the general formula (6) with 1-amino-8-naphthol-3,6-disulfonic acid or 1-amino-8-napththol-4,6-disulfonic acid is carried out initially in an acidic medium, such as at a pH value of between 0 and 3, analogously to known methods, so that this diazonium compound is coupled into the 2-position of the naphthalene radical; subsequently the coupling with the second diazo component is carried out in a slightly acidic to slightly alkaline medium, such as at a pH value of between 3.5 and 8, the coupling occurring in the 7-position of the naphthalene radical of the monoazo compound formed. Such methods are known, for example, from German Patent Specifications 960,534 and 1,644,198.

Aromatic amines of the general formula (6) in which q is equal to zero, or of the general formula (7) in which s is equal to zero, are, for example: aniline-3-β-sulfatoethylsulfone, aniline-4-β-sulfatoethylsulfone, 2-aminotoluene-4-β-sulfatoethylsulfone, 2-aminoanisole-4-β-sulfatoethylsulfone, 2-aminoanisole-5-β-sulfatoethylsulfone, 2,5-dimethoxyaniline-4-β-sulfatoethylsulfone, 2,4-dimethoxyaniline-5-β-sulfatoethylsulfone, 2-methoxy-5-methylaniline-4-β-sulfatoethylsulfone, 4-aminoanisole-3-β-sulfatoethylsulfone, 4-aminotoluene-3-β-sulfatoethylsulfone, 4-β-sulfatoethylsulfonylaniline-2-sulfonic acid, 5-β-sulfatoethylsulfonylaniline-2-sulfonic acid, 2-aminotoluene-5-β-sulfatoethylsulfone, 2-chloroaniline-4-β-sulfatoethylsulfone, 2-chloroaniline-5-β-sulfatoethylsulfone, 2-bromoaniline-4-β-sulfatoethylsulfone, 2,6-dichloroaniline-4-β-sulfatoethylsulfone, 2,6-dimethylaniline-3-β-sulfatoethylsulfone, 2,6-dimethylaniline-4-β-sulfatoethylsulfone, 2-naphthylamine-5-β-sulfatoethylsulfone, 2-naphthylamine-6-β-sulfatoethylsulfone, 2-naphthylamine-8-β-sulfatoethylsulfone, 8-β-sulfatoethylsulfonyl-2-aminonaphthalene-6-sulfonic acid, 6-β-sulfatoethylsulfonyl-2-aminonaphthalene-1-sulfonic acid, N-methyl-N-β-sulfatoethylsulfonyl-p-phenylenediamine, N-methyl-N-β-sulfatoethylsulfonyl-m-phenylenediamine, (4-aminobenzyl)-(β-sulfatoethyl)-sulfone and (3-aminobenzyl)-(β-sulfatoethyl)-sulfone and their corresponding β-chloroethyl derivatives, β-acetoxyethyl derivatives, β-phosphatoethyl derivatives, β-thiosulfatoethyl derivatives and vinylsulfonyl derivatives.

Aromatic amines of the general formula (6) in which p is equal to zero, or of the general formula (7) in which r is equal to zero, are, for example, compounds corresponding to the general formulae (8a), (8b) and (8c)

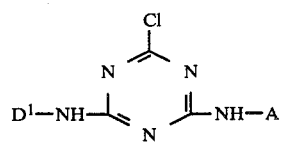 (8a)

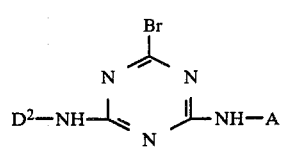 (8b)

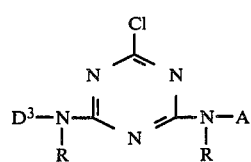 (8c)

wherein $D^1$ is, for example, the 3-amino-4-sulfophenyl radical, the 4-amino-3-sulfophenyl radical, the 4-amino-2,5-disulfophenyl radical, the 3-amino-4,6-disulfophenyl radical, the 4-aminophenyl radical, the 3-amino-2-methyl-5-sulfophenyl radical, the 3-amino-4-chlorophenyl radical, the 4-amino-3,5-disulfophenyl radical, the 3-amino-4-methylphenyl radical, the 3-amino-4-methoxyphenyl radical, the 6-amino-4,8-disulfonaphth-2-yl radical, the 5-amino-3,7-disulfonaphth-1-yl radical or the 3-aminophenyl radical, $D^2$ is, for example, the 3-amino-4-sulfophenyl radical or the 4-amino-3-sulfophenyl radical and $D^3$ is, for example, the 3-amino-4-sulfophenyl radical, the 4-amino-3-sulfophenyl radical or the 4-aminophenyl radical, and one R is a hydrogen atom and the other R is a methyl group, and A is in each case, for example, a hydrogen atom, or a methyl radical, ethyl radical, n-propyl radical, isopropyl radical, β-hydroxyethyl radical, β-sulfatoethyl radical, β-methoxyethyl radical, β-sulfoethyl radical, carboxymethyl radical, β-carboxyethyl radical, benzyl radical, β-phenethyl radical, phenyl radical, 4-sulfophenyl radical, 3-sulfophenyl radical, 3-carboxyphenyl radical, 4-carboxyphenyl radical, 2,5-disulfophenyl radical or 3-hydroxy-4-carboxyphenyl radical, or the formula moiety A in each case is a radical of the general formula (4a)

$$-B-Z^1 \qquad (4a)$$

in which B is, for example, the 1,4-phenylene radical, 1,3-phenylene radical, 4-methyl-1,3-phenylene radical, 4-methoxy-1,3-phenylene radical, 3-methoxy-1,4-phenylene radical, 2,5-dimethoxy-1,4-phenylene radical, 4,6-dimethoxy-1,3-phenylene radical, 2-methyl-5-methoxy-1,4-phenylene radical, 3-chloro-1,4-phenylene radical, 6-methoxy-1,3-phenylene radical, 6-methyl-1,3-phenylene radical, 4-sulfo-1,3-phenylene radical, 4-methyl-1,3-phenylene radical, 4-chloro-1,3-phenylene radical, 3-bromo-1,4-phenylene radical or the 2,4-dimethyl-1,3-phenylene radical with, in each case, the group $Z^1$, defined below, in the 1-position of the phenylene radicals and $Z^1$ is the β-chloroethylsulfonyl group, β-acetoxyethylsulfonyl group, β-thiosulfatoethylsulfonyl group, β-phosphatoethylsulfonyl group or the vinylsulfonyl group or preferably the β-sulfatoethylsulfonyl group or in which the formula moiety A is, in each case, one of the radicals indicated formally below

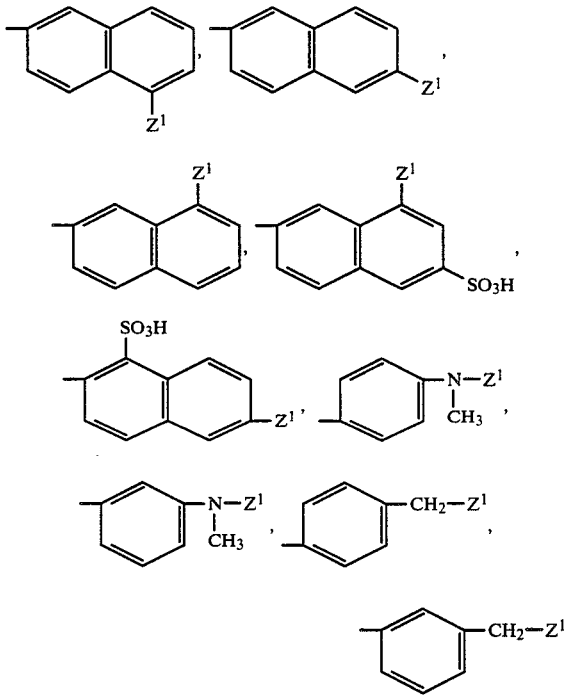

in which $Z^1$ has one of the abovementioned meanings.

The separation or isolation of the compounds of the general formula (1), prepared according to the invention, is carried out accordingly to generally known methods, either by precipitating from the reaction medium using electrolytes, such as, for example, sodium chloride or potassium chloride, or by concentrating the reaction solution by evaporating, for example by spray-drying. In many cases it can also be desirable to use the dyestuff solution, if appropriate after the addition of a buffer substance and if appropriate after possible concentrating, directly as a liquid preparation for dyeing.

Among the compounds according to the invention, those are preferred which correspond to the general formulae (9), (10), (11), (12), (13) and (14):

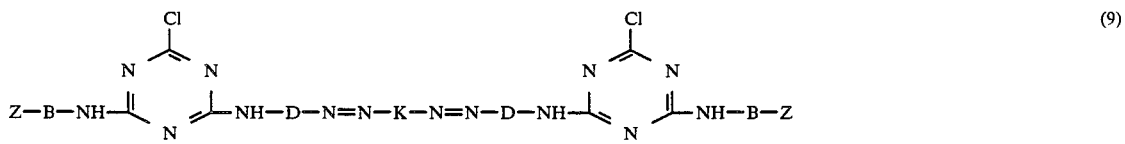

(9)

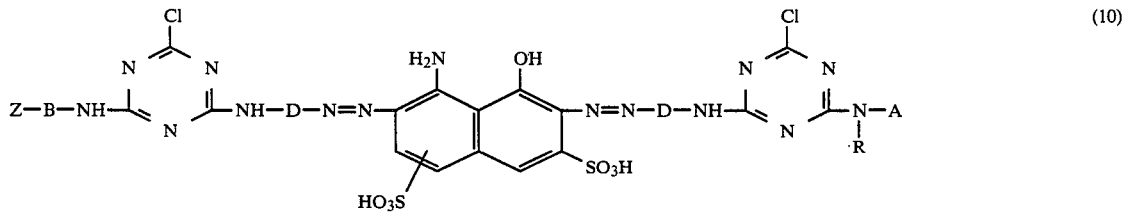

(10)

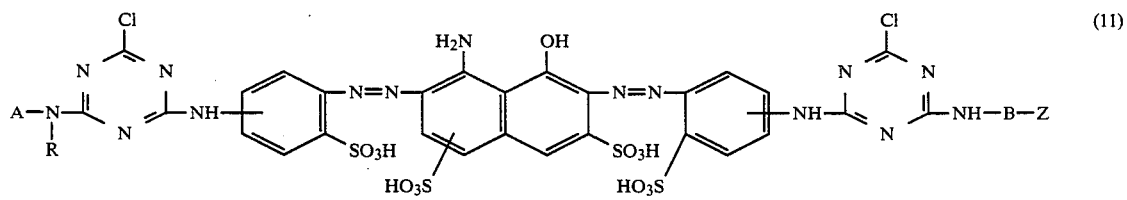

(11)

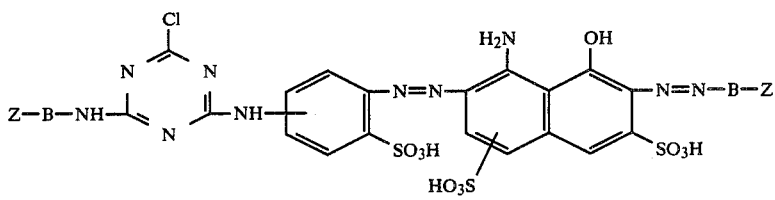
(12)

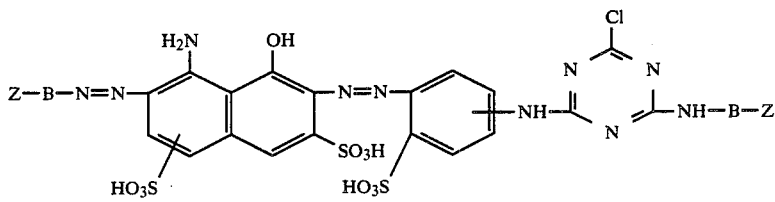
(13)

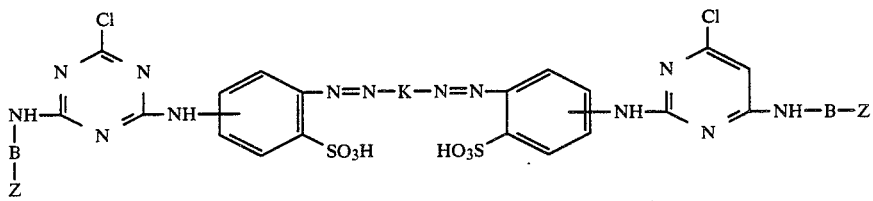
(14)

In these formulae: Z has the abovementioned meaning, but is preferably the β-sulfatoethylsulfonyl group or the vinylsulfonyl group; B is the phenylene radical which can be substituted by a sulfo group or a methyl group or methoxy group, or by a chlorine atom or two methoxy groups or a methoxy group and a methyl group, it being possible for the two formula moieties B to be identical or to be different from one another; D is the phenylene radical, which can be substituted by one or two sulfo groups or by a methoxy group, a methyl group or a chlorine atom, or by two methoxy groups or by a methoxy group and a methyl group, it being possible for the two formula moieties D to be identical or different from one another; A is a methyl group or ethyl group, or a β-hydroxyethyl group, β-sulfoethyl group, carboxyethyl group, β-sulfatoethyl group or sulfophenyl group; R is a hydrogen atom, or a methyl group or ethyl group; K represents the divalent radical of 1-amino-8-naphthol-3,6-disulfonic acid or 1-amino-8-naphthol-4,6-disulfonic acid, which can be subjected to two couplings and which serves as the coupling component; the two free amino bridges in formula (11) are linked in the meta or para-position relative to the azo groups.

The disazo compounds of the general formula (1), according to the invention, have valuable dyestuff properties which at the same time exhibit fiber-reactive properties due to their chlorotriazinylene component or bromotriazinylene component and the radical Z. The new compounds are used preferably for the dyeing (in the general sense) of materials containing hydroxyl groups, amino groups, or carboxamide groups, for example in the form of sheet-like structures, such as paper, foils and leather, or in bulk, such as of polyamide and polyurethane, particularly, however, of fibers made of these materials.

Therefore, the present invention relates also to the use of the compounds of the general formula (1) for the dyeing (including bulk-dyeing and printing) of these materials, and to processes for the dyeing of such materials, for which a compound of the general formula (1) is used as the dyeing agent in a quite conventional manner. The materials are preferably used in the form of fiber materials, particularly in the form of textile fibers.

Materials containing hydroxy groups are natural or synthetic materials containing hydroxy groups, such as, for example, cellulose fiber materials or their regenerated products or polyvinyl alcohols. Cellulose fiber materials are preferably cotton, but also other vegetable fibers, such as linen, hemp, jute and ramie fibers; regenerated cellulose fibers are, for example, viscose staple and viscose rayon yarn.

Materials containing carbonamide groups are, for example, synthetic and natural polyamides and polyurethanes, particularly in the form of fibers, for example wool and other animal hairs, silk, leather, polyamide-6,6, polyamide-6, polyamide-11 and polyamide-4.

The dyestuffs according to the invention can be applied to the abovementioned substrates according to the application techniques known for reactive dyestuffs. Very good color yields are obtained when they are used on cellulose fibers according to the exhaustion method, from dyebaths of long liquor ratios, for example, by using the most diverse additions of alkali.

Likewise, excellent color yields are obtained on cellulose fibers when using the padding methods, it being possible to carry out the fixing by leaving them at room temperature, by steaming, or by using dry heat.

Likewise, intense prints having well-delineated contours and a clear white ground are obtained by the customary printing methods for cellulose fibers, printed by a one-step method in the presence of sodium bicarbonate or other acid-binding agents in the printing paste with subsequent steaming at 101°-103° C., or printed by a two-step method with a neutral or slightly acid printing paste and then either being passed through a hot alkaline bath containing an electrolyte or being padded with an alkaline padding liquor containing an electrolyte and then being developed by leaving to stand, steaming or dry heat. The outcome of the print depends only to a small extent on varying conditions of fixing. Extraordinarily high degrees of fixing can be obtained with the dyestuffs according to the invention, both in dyeing and in printing.

The fastness properties of the dyeing and prints obtained with the dyestuffs according to the invention on cellulose fibers are impressive. This is true for both the most important processing fastness properties and for the most important end-use fastness properties. Particular mention should be made of the light-fastness, the wet-fastness properties such as wash-fastness properties, milling-fastness properties, water-fastness, seawater-fastness, fastness to cross-dyeing and perspiration-fastness as well as fastness to pleating, ironing and rubbing.

The dyeings on polyamide fibers are customarily carried out in an acid medium. For example, acetic acid or acetic acid and ammonium acetate can be added to the dyebath to obtain the desired pH value. In order to achieve an especially good levelness of the dyeings it is recommended to add a customary leveling agent, for example prepared on the basis of a reaction product of cyanuric chloride with the three-fold molar quantity of an aminobenzenesulfonic acid and/or an aminophthalenesulfonic acid, and/or based on a reaction product of, for example, stearylamine with ethylene oxide. Dyeings can be carried out both at the boil and up to 125° C., such as 110° to 120° C.

The Examples below serve to illustrate the invention. Unless otherwise indicated, the parts mentioned therein are parts by weight and the values in percent represent percentages by weight. Parts by weight are related to parts by volume in the same way as the kilogram is related to the liter.

EXAMPLE 1

A neutral solution of 28.1 parts of aniline-4-β-sulfatoethylsulfone in 150 parts of water is poured, with stirring, into a suspension which is obtained by stirring a solution of 19.5 parts of cyanuric chloride in 100 parts by volume of acetone into a mixture of 200 parts of water and 200 parts of ice. The reaction mixture is then stirred for one hour at 0° to 5° C. and at a pH value of 3 to 4, 8.4 parts of sodium bicarbonate being added in portions to maintain the pH value. Subsequently, a neutral solution of 26.8 parts of 1,4-diaminobenzene-2,5-disulfonic acid in 200 parts of water is added to the resulting suspension of the primary condensation product: this reaction mixture is stirred for about 18 hours at 25° to 28° C. and at a pH value of 6.5 to 7.2, the pH value being maintained in the indicated range by the addition of sodium bicarbonate in portions. The secondary reaction product formed gives a clear solution. 250 parts of ice and then 60 parts by volume of 31% strength aqueous hydrochloric acid are added to this solution; the subsequent diazotization is effected by the dropwise addition of 20 parts by volume of aqueous 5N sodium nitrite solution at a temperature of 0° to 5° C. The diazonium salt solution obtained is then added dropwise at a pH value of 2.5 to 3.0 and at a temperature of 0° to 10° C. to a solution of 31.9 parts of 1-amino-8-naphthol-3,6-disulfonic acid in 1,500 parts of water, the pH being maintained between 2.5 to 3.0 by the addition, in portions, of 63 parts by crystalline sodium acetate. After the coupling is complete, the monoazo compound formed is precipitated by means of potassium chloride and filtered off with suction.

The moist filter cake of this monoazo compound is dissolved in 500 parts of water. A further batch of the secondary condensation product of cyanuric chloride with aniline-4-β-sulfatoethylsulfone and 1,4-diaminobenzene-2,5-disulfonic acid, diazotized as described above, is added dropwise to this aqueous solution of the monoazo compound, a temperature of 10° to 18° C. and a pH value of 6.0 to 6.5 being maintained. The coupling reaction is continued for 4 hours with stirring. The solution is then filtered and the diazo compound formed is salted out by adding sodium chloride and is then filtered off with suction, dried at 40° to 50° C. and ground.

A black powder, which contains electrolyte (predominantly sodium chloride), is obtained, this powder containing the alkali metal salt, predominantly the sodium salt, of the compound of the formula

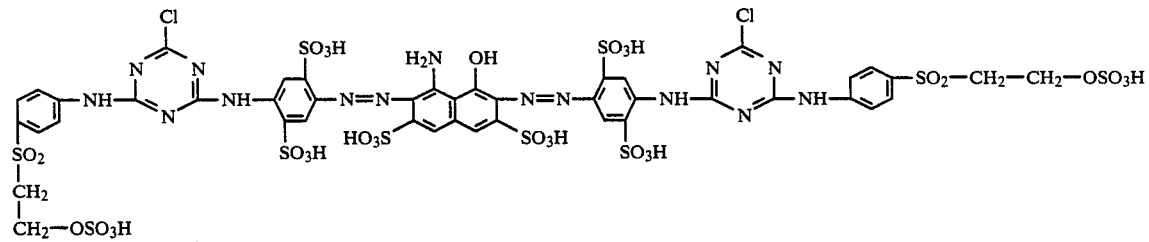

This compound exhibits very good dyestuff properties and dyes cellulose fiber materials, such as cotton, in greenish-tinged black shades, according to the dyeing, printing and fixing methods customary for reactive dyestuffs; these dyes and prints exhibit very good end-use and processing fastness properties, such as, in particular, very good fastness to washing, perspiration, rubbing, water, acids and alkalis. In connection with printing methods on cellulose fibers, the steam stability and the good rinsing-out property of unfixed dyestuff portions should in particular be mentioned, furthermore the high degree of fixation and the identical outcome of the prints, if fixed by various methods.

EXAMPLES 2 TO 42

If one of the methods according to the invention is used for preparing the compounds according to the invention, corresponding to the general formula (1), for example analogously to the method given in Example 1, and for this purpose, as starting materials in the corresponding manner, 1,3-diaminobenzene-2-sulfonic acid or 1,4-diaminobenzene-2-sulfonic acid, cyanuric chloride and an aniline-derivative or a naphthylamine derivative having a β-sulfatoethylsulfonyl group, which can be seen in the Examples in the table below in connection with the general formula (A), is used as condensation components, and 1-amino-8-naphthol-3,6-disulfonic acid or 1-amino-8-naphthol-4,6-disulfonic acid are used as coupling component, the disazo compounds according to the invention, given in these Examples in the table below, are obtained, which possess very good dyestuff properties and which likewise yield, on natural and synthetic polyamide fiber materials, but particularly on natural and regenerated cellulose fiber materials, such as in particular cotton, preferably according to the dyeing, printing and fixing methods customary for fiber-reactive dyestuffs, intense dyeings and prints having very good fastness properties and the shades given in the Examples in the table.

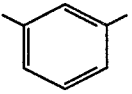

(A)

| Example | B₁ | Position of the NH group | Position of the SO₃H group | Shade on cotton |
|---|---|---|---|---|
| 2 | HO₃SOCH₂CH₂—O₂S—⌬— (meta) | 4' | 3 | greenish-tinged black |
| 3 | " | 3' | 3 | blue-black |
| 4 | " | 4' | 4 | black |
| 5 | " | 3' | 4 | navy blue |
| 6 | HO₃SOCH₂CH₂—O₂S—⌬— (para) | 4' | 4 | navy blue |
| 7 | " | 3' | 4 | reddish-tinged navy |
| 8 | HO₃SOCH₂CH₂—O₂S—⌬(OCH₃, CH₃)— | 4' | 3 | dark grey |
| 9 | " | 3' | 3 | blue-black |
| 10 | " | 4' | 4 | dark blue |
| 11 | " | 3' | 4 | reddish-tinged navy |
| 12 | HO₃SOCH₂CH₂—O₂S—⌬(OCH₃, OCH₃)— | 4' | 3 | dark blue |
| 13 | " | 3' | 3 | dark blue |
| 14 | " | 4' | 4 | navy blue |
| 15 | " | 3' | 4 | reddish-tinged navy |
| 16 | HO₃SOCH₂CH₂—O₂S—N(CH₃)—⌬— | 4' | 3 | dark grey |
| 17 | " | 3' | 3 | navy blue |
| 18 | HO₃SOCH₂CH₂SO₂—H₂C—⌬— | 3' | 3 | black |
| 19 | " | 4' | 3 | black |
| 20 | " | 3' | 4 | black |

-continued

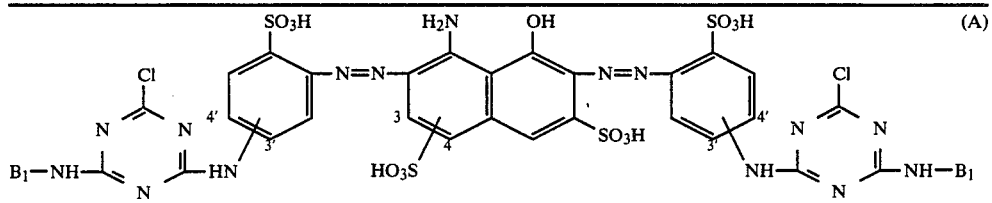 (A)

| Example | B₁ | Position of the NH group | Position of the SO₃H group | Shade on cotton |
|---|---|---|---|---|
| 21 | HO₃SOCH₂CH₂—O₂S—C₆H₄— | 4' | 3 | greenish-tinged navy |
| 22 | " | 3' | 3 | reddish-tinged navy |
| 23 | HO₃SOCH₂CH₂—O₂S—C₆H₃(CH₃)— | 4' | 3 | greenish-tinged black |
| 24 | " | 3' | 3 | blue-black |
| 25 | " | 4' | 4 | greenish-tinged navy |
| 26 | " | 3' | 4 | black |
| 27 | HO₃SOCH₂CH₂—O₂S—C₆H₂(OCH₃)₂— | 3' | 3 | greenish-tinged black |
| 28 | " | 4' | 3 | blue-black |
| 29 | " | 3' | 4 | navy blue |
| 30 | " | 4' | 4 | navy blue |
| 31 | HO₃SOCH₂CH₂—O₂S—C₆H₃(OCH₃)— | 3' | 3 | dark blue |
| 32 | " | 4' | 3 | dark blue |
| 33 | " | 3' | 4 | navy blue |
| 34 | " | 4' | 4 | black |
| 35 | HO₃SOCH₂CH₂—O₂S-naphthyl(SO₃H)— | 3' | 3 | navy blue |
| 36 | " | 4' | 3 | black |
| 37 | " | 3' | 4 | dark blue |
| 38 | " | 4' | 4 | black |
| 39 | HO₃SOCH₂CH₂—O₂S-naphthyl(SO₃H)— | 3' | 3 | dark blue |
| 40 | " | 4' | 3 | greenish-tinged black |
| 41 | " | 3' | 4 | navy blue |
| 42 | " | 4' | 4 | reddish-tinged navy |

EXAMPLES 43 TO 229

If one of the methods according to the invention is used for preparing the compounds according to the invention, corresponding to the general formula (1), for example analogously to the method given in Example 1, and for this purpose, as starting materials in the corresponding manner, 1,3-diaminobenzene derivatives or 1,4-diaminobenzene derivatives or 1,5-diaminonaphthalene derivatives or 2,6-diaminonaphthalene derivatives, cyanuric chloride and an aniline derivative or a naphthylamine derivative having a β-sulfatoethylsulfonyl group, which can be seen in the Examples in the table below in connection with the general formula (B), are used as condensation components, and 1-amino-8-naphthol-3,6-disulfonic acid or 1-amino-8-naphthol-4,6-disulfonic acid are used as coupling components, the disazo compounds according to the invention, given in these Examples in the table below, are obtained, which possess very good dyestuff properties and which likewise yield, on natural and synthetic polyamide fiber materials, but particularly on natural and regenerated cellulose fiber materials, such as in particular cotton, preferably according to the dyeing, printing and fixing methods customary for fiber-reactive dyestuffs, intense dyeings and prints having very good fastness properties and the shades given in the Examples in the table.

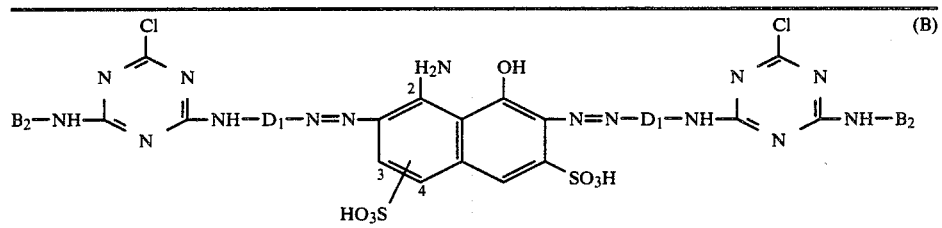

| Example | $B_2$ | $D_1$ | Position of $HO_3S$ | Shade on cotton |
|---|---|---|---|---|
| 43 | 4″-(β-sulfatoethylsulfonyl)phenyl | 4′,6′-disulfo-1′,3′-phenylene | 3 | navy blue |
| 44 | 4″-(β-sulfatoethylsulfonyl)phenyl | 5′-sulfo-2′-methyl-1′,3′-phenylene | 3 | navy blue |
| 45 | 4″-(β-sulfatoethylsulfonyl)phenyl | 4′-methyl-1′,3′-phenylene | 3 | black |
| 46 | 4″-(β-sulfatoethylsulfonyl)phenyl | 4′-methoxy-1′,3′-phenylene | 3 | black |
| 47 | 4″-(β-sulfatoethylsulfonyl)phenyl | 4′,8′-disulfo-2′,6′-naphthylene | 3 | navy blue |
| 48 | 4″-(β-sulfatoethylsulfonyl)phenyl | 3′,7′-disulfo-1′,5′-naphthylene | 3 | navy blue |
| 49 | 4″-(β-sulfatoethylsulfonyl)phenyl | p-phenylene | 3 | greenish-tinged black |
| 50 | 4″-(β-sulfatoethylsulfonyl)phenyl | m-phenylene | 3 | black |
| 51 | 4″-(β-sulfatoethylsulfonyl)phenyl | 4′,6′-disulfo-1′,3′-phenylene | 4 | navy blue |
| 52 | 4″-(β-sulfatoethylsulfonyl)phenyl | 5′-sulfo-2′-methyl-1′,3′-phenylene | 4 | navy blue |
| 53 | 4″-(β-sulfatoethylsulfonyl)phenyl | 4′-methyl-1′,3′-phenylene | 4 | black |
| 54 | 4″-(β-sulfatoethylsulfonyl)phenyl | 4′-methoxy-1′,3′-phenylene | 4 | black |
| 55 | 4″-(β-sulfatoethylsulfonyl)phenyl | 4′,8′-disulfo-2′,6′-naphthylene | 4 | navy blue |
| 56 | 4″-(β-sulfatoethylsulfonyl)phenyl | 3′,7′-disulfo-1′,5′-naphthylene | 4 | navy blue |
| 57 | 4″-(β-sulfatoethylsulfonyl)phenyl | p-phenylene | 4 | greenish-tinged black |
| 58 | 4″-(β-sulfatoethylsulfonyl)phenyl | m-phenylene | 4 | black |
| 59 | 4″-(β-sulfatoethylsulfonyl)phenyl | 2′,5′-disulfo-1′,4′-phenylene | 4 | greenish-tinged black |
| 60 | 3″-(β-sulfatoethylsulfonyl)phenyl | 4′,6′-disulfo-1′,3′-phenylene | 3 | navy blue |
| 61 | 3″-(β-sulfatoethylsulfonyl)phenyl | 5′-sulfo-2′-methyl-1′,3′-phenylene | 3 | navy blue |
| 62 | 3″-(β-sulfato- | 4′-methyl-1′,3′- | 3 | black |

-continued (B)

Structure: B₂—NH—C(=N)(—N=C(Cl)—N—)—NH—D₁—N=N—[naphthalene with 1-OH, 2-NH₂, SO₃H, HO₃S at position 3 or 4]—N=N—D₁—NH—C(=N—C(Cl)=N—)—NH—B₂

| Example | B₂ | D₁ | Position of HO₃S | Shade on cotton |
|---|---|---|---|---|
| | ethylsulfonyl)-phenyl | phenylene | | |
| 63 | 3″-(β-sulfatoethylsulfonyl)-phenyl | 4′-methoxy-1′,3′-phenylene | 3 | black |
| 64 | 3″-(β-sulfatoethylsulfonyl)-phenyl | 4′,8′-disulfo-2′,6′-naphthylene | 3 | navy blue |
| 65 | 3″-(β-sulfatoethylsulfonyl)-phenyl | 3′,7′-disulfo-1′,5′-naphthylene | 3 | navy blue |
| 66 | 3″-(β-sulfatoethylsulfonyl)-phenyl | p-phenylene | 3 | greenish-tinged black |
| 67 | 3″-(β-sulfatoethylsulfonyl)-phenyl | m-phenylene | 3 | black |
| 68 | 3″-(β-sulfatoethylsulfonyl)-phenyl | 4′,6′-disulfo-1′,3′-phenylene | 4 | navy blue |
| 69 | 3″-(β-sulfatoethylsulfonyl)-phenyl | 5′-sulfo-2′-methyl-1′,3′-phenylene | 4 | navy blue |
| 70 | 3″-(β-sulfatoethylsulfonyl)-phenyl | 4′-methyl-1′,3′-phenylene | 4 | black |
| 71 | 3″-(β-sulfatoethylsulfonyl)-phenyl | 4′-methoxy-1′,3′-phenylene | 4 | black |
| 72 | 3″-(β-sulfatoethylsulfonyl)-phenyl | 4′,8′-disulfo-2′,6′-naphthylene | 4 | navy blue |
| 73 | 3″-(β-sulfatoethylsulfonyl)-phenyl | 3′,7′-disulfo-1′,5′-naphthylene | 4 | navy blue |
| 74 | 3″-(β-sulfatoethylsulfonyl)-phenyl | p-phenylene | 4 | greenish-tinged black |
| 75 | 3″-(β-sulfatoethylsulfonyl)-phenyl | m-phenylene | 4 | black |
| 76 | 3″-(β-sulfatoethylsulfonyl)-phenyl | 2′,5′-disulfo-1′,4′-phenylene | 4 | greenish-tinged black |
| 77 | 2″-methoxy-5″-methyl-4″-(β-sulfatoethylsulfonyl)-phenyl | 4′,6′-disulfo-1′,3′-phenylene | 3 | navy blue |
| 78 | 2″-methoxy-5″-methyl-4″-(β-sulfatoethylsulfonyl)-phenyl | 5′-sulfo-2′-methyl-1′,3′-phenylene | 3 | navy blue |
| 79 | 2″-methoxy-5″-methyl-4″-(β-sulfatoethylsulfonyl)-phenyl | 4′-methyl-1′,3′-phenylene | 3 | black |
| 80 | 2″-methoxy-5″-methyl-4″-(β-sulfatoethylsulfonyl)-phenyl | 4′-methoxy-1′,3′-phenylene | 3 | black |
| 81 | 2″-methoxy-5″-methyl-4″-(β-sulfatoethylsulfonyl)- | 4′,8′-disulfo-2′,6′-naphthylene | 3 | navy blue |

-continued

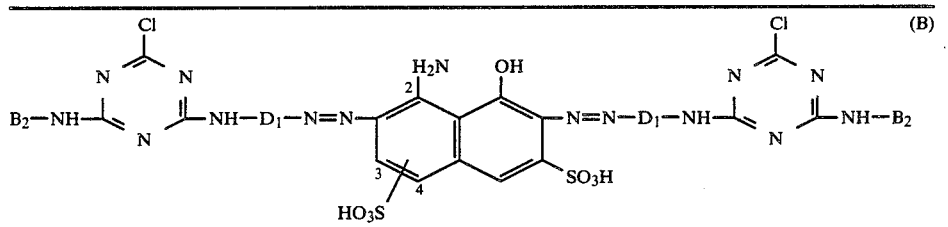
(B)

| Example | B₂ | D₁ | Position of HO₃S | Shade on cotton |
|---|---|---|---|---|
| 82 | 2″-methoxy-5″-methyl-4″-(β-sulfatoethylsulfonyl)-phenyl | 3′,7′-disulfo-1′,5′-naphthylene | 3 | navy blue |
| 83 | 2″-methoxy-5″-methyl-4″-(β-sulfatoethylsulfonyl)-phenyl | p-phenylene | 3 | greenish-tinged black |
| 84 | 2″-methoxy-5″-methyl-4″-(β-sulfatoethylsulfonyl)-phenyl | m-phenylene | 3 | black |
| 85 | 2″-methoxy-5″-methyl-4″-(β-sulfatoethylsulfonyl)-phenyl | 4′,6′-disulfo-1′,3′-phenylene | 4 | navy blue |
| 86 | 2″-methoxy-5″-methyl-4″-(β-sulfatoethylsulfonyl)-phenyl | 5′-sulfo-2′-methyl-1′,3′-phenylene | 4 | navy blue |
| 87 | 2″-methoxy-5″-methyl-4″-(β-sulfatoethylsulfonyl)-phenyl | 4′-methyl-1′,3′-phenylene | 4 | black |
| 88 | 2″-methoxy-5″-methyl-4″-(β-sulfatoethylsulfonyl)-phenyl | 4′-methoxy-1′,3′-phenylene | 4 | black |
| 89 | 2″-methoxy-5″-methyl-4″-(β-sulfatoethylsulfonyl)-phenyl | 4′,8′-disulfo-2′,6′-naphthylene | 4 | navy blue |
| 90 | 2″-methoxy-5″-methyl-4″-(β-sulfatoethylsulfonyl)-phenyl | 3′,7′-disulfo-1′,5′-naphthylene | 4 | navy blue |
| 91 | 2″-methoxy-5″-methyl-4″-(β-sulfatoethylsulfonyl)-phenyl | p-phenylene | 4 | greenish-tinged black |
| 92 | 2″methoxy-5″-methyl-4″-(β-sulfatoethylsulfonyl)-phenyl | m-phenylene | 4 | black |
| 93 | 2″-methoxy-5″-methyl-4″-(β-sulfatoethyl- | 2′,5′-disulfo-1′,4′-phenylene | 4 | greenish-tinged black |
| 94 | 2″,5″-dimethoxy-4″-(β-sulfatoethylsulfonyl)-phenyl | 4′,6′-disulfo-1′,3′-phenylene | 3 | navy blue |
| 95 | 2″,5″-dimethoxy-4″-(β-sulfatoethylsulfonyl)-phenyl | 5′-sulfo-2′-methyl-1′,3′-phenylene | 3 | navy blue |
| 96 | 2″,5″-dimethoxy-4″-(β-sulfato- | 4′-methyl-1′,3′-phenylene | 3 | black |

-continued

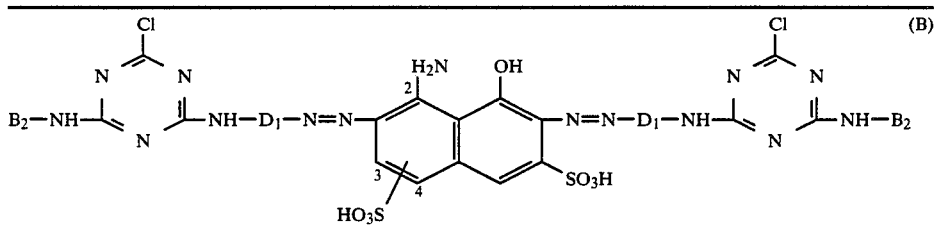

| Example | B$_2$ | D$_1$ | Position of HO$_3$S | Shade on cotton |
|---|---|---|---|---|
| | ethylsulfonyl)-phenyl | | | |
| 97 | 2″,5″-dimethoxy-4″-(β-sulfato-ethylsulfonyl)-phenyl | 4′-methoxy-1′,3′-phenylene | 3 | black |
| 98 | 2″,5″-dimethoxy-4″-(β-sulfato-ethylsulfonyl)-phenyl | 4′,8′-disulfo-2′,6′-naphthylene | 3 | navy blue |
| 99 | 2″,5″-dimethoxy-4″-(β-sulfato-ethylsulfonyl)-phenyl | 3′,7′-disulfo-1′,5′-naphthylene | 3 | navy blue |
| 100 | 2″,5″-dimethoxy-4″-(β-sulfato-ethylsulfonyl)-phenyl | p-phenylene | 3 | greenish-tinged black |
| 101 | 2″,5″-dimethoxy-4″-(β-sulfato-ethylsulfonyl)-phenyl | m-phenylene | 3 | black |
| 102 | 2″,5″-dimethoxy-4″-(β-sulfato-ethylsulfonyl)-phenyl | 4′,6′-disulfo-1′,3′-phenylene | 4 | navy blue |
| 103 | 2″,5″-dimethoxy-4″-(β-sulfato-ethylsulfonyl)-phenyl | 5′-sulfo-2′-methyl-1′,3′-phenylene | 4 | navy blue |
| 104 | 2″,5″-dimethoxy-4″-(β-sulfato-ethylsulfonyl)-phenyl | 4′-methyl-1′,3′-phenylene | 4 | black |
| 105 | 2″,5″-dimethoxy-4″-(β-sulfato-ethylsulfonyl)-phenyl | 4′-methoxy-1′,3′-phenylene | 4 | black |
| 106 | 2″,5″-dimethoxy-4″-(β-sulfato-ethylsulfonyl)-phenyl | 4′,8′-disulfo-2′,6′-naphthylene | 4 | navy blue |
| 107 | 2″,5″-dimethoxy-4″-(β-sulfato-ethylsulfonyl)-phenyl | 3′,7′-disulfo-1′,5′-naphthylene | 4 | navy blue |
| 108 | 2″,5″-dimethoxy-4″-(β-sulfato-ethylsulfonyl)-phenyl | p-phenylene | 4 | greenish-tinged black |
| 109 | 2″,5″-dimethoxy-4″-(β-sulfato-ethylsulfonyl)-phenyl | m-phenylene | 4 | black |
| 110 | 2″,5″-dimethoxy-4″-(β-sulfato-ethylsulfonyl)-phenyl | 2′,5′-disulfo-1′,4′-phenylene | 4 | greenish-tinged black |
| 111 | 4″-N—methyl-N—(β-sulfatoethyl-sulfonyl)-phenyl | 4′,6′-disulfo-1′,3′-phenylene | 3 | navy blue |
| 112 | 4″-N—methyl-N—(β-sulfatoethyl-sulfonyl)-phenyl | 5′-sulfo-2′-methyl-1′,3′-phenylene | 3 | navy blue |
| 113 | 4″-N—methyl-N—(β-sulfatoethyl-sulfonyl)-phenyl | 4′-methyl-1′,3′-phenylene | 3 | black |
| 114 | 4″-N—methyl-N—(β-sulfatoethyl- | 4′-methoxy-1′,3′-phenylene | 3 | black |

-continued

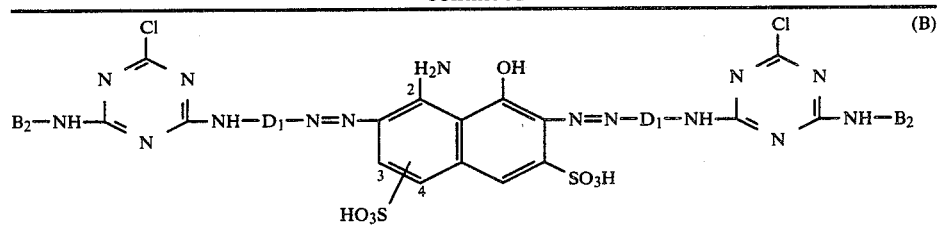

| Example | B₂ | D₁ | Position of HO₃S | Shade on cotton |
|---|---|---|---|---|
| | sulfonyl)-phenyl | | | |
| 115 | 4″-N—methyl-N—(β-sulfatoethyl-sulfonyl)-phenyl | 4',8'-disulfo-2',6'-naphthylene | 3 | navy blue |
| 116 | 4″-N—methyl-N—(β-sulfatoethyl-sulfonyl)-phenyl | 3',7'-disulfo-1',5'-naphthylene | 3 | navy blue |
| 117 | 4″-N—methyl-N—(β-sulfatoethyl-sulfonyl)-phenyl | p-phenylene | 3 | greenish-tinged black |
| 118 | 4″-N—methyl-N—(β-sulfatoethyl-sulfonyl)-phenyl | m-phenylene | 3 | black |
| 119 | 4″-N—methyl-N—(β-sulfatoethyl-sulfonyl)-phenyl | 4',6'-disulfo-1',3'-phenylene | 4 | navy blue |
| 120 | 4″-N—methyl-N—(β-sulfatoethyl-sulfonyl)-phenyl | 5'-sulfo-2'-methyl-1',3'-phenylene | 4 | navy blue |
| 121 | 4″-N—methyl-N—(β-sulfatoethyl-sulfonyl)-phenyl | 4'-methyl-1',3'-phenylene | 4 | black |
| 122 | 4″-N—methyl-N—(β-sulfatoethyl-sulfonyl)-phenyl | 4'-methoxy-1',3'-phenylene | 4 | black |
| 123 | 4″-N—methyl-N—(β-sulfatoethyl-sulfonyl)-phenyl | 4',8'-disulfo-2',6'-naphthylene | 4 | navy blue |
| 124 | 4″-N—methyl-N—(β-sulfatoethyl-sulfonyl)-phenyl | 3',7'-disulfo-1',5'-naphthylene | 4 | navy blue |
| 125 | 4″-N—methyl-N—(β-sulfatoethyl-sulfonyl)-phenyl | p-phenylene | 4 | greenish-tinged black |
| 126 | 4″-N—methyl-N—(β-sulfatoethyl-sulfonyl)-phenyl | m-phenylene | 4 | black |
| 127 | 4″-N—methyl-N—(β-sulfatoethyl-sulfonyl)-phenyl | 2',5'-disulfo-1',4'-phenylene | 4 | greenish-tinged black |
| 128 | 3″-(β-sulfato-ethylsulfonyl-methyl)-phenyl | 4',6'-disulfo-1',3'-phenylene | 3 | navy blue |
| 129 | 3″-(β-sulfato-ethylsulfonyl-methyl)-phenyl | 5'-sulfo-2'-methyl-1',3'-phenylene | 3 | navy blue |
| 130 | 3″-(β-sulfato-ethylsulfonyl-methyl)-phenyl | 4'-methyl-1',3'-phenylene | 3 | black |
| 131 | 3″-(β-sulfato-ethylsulfonyl-methyl)-phenyl | 4'-methoxy-1',3'-phenylene | 3 | black |
| 132 | 3″-(β-sulfato-ethylsulfonyl-methyl)-phenyl | 4',8'-disulfo-2',6'-naphthylene | 3 | navy blue |
| 133 | 3″-(β-sulfato-ethylsulfonyl-methyl)-phenyl | 3',7'-disulfo-1',5'-naphthylene | 3 | navy blue |
| 134 | 3″-(β-sulfato-ethylsulfonyl-methyl)-phenyl | p-phenylene | 3 | greenish-tinged black |
| 135 | 3″-(β-sulfato-ethylsulfonyl-methyl)-phenyl | m-phenylene | 3 | black |
| 136 | 3″-(β-sulfato-ethylsulfonyl-methyl)-phenyl | 4',6'-disulfo-1',3'-phenylene | 4 | navy blue |
| 137 | 3″-(β-sulfato-ethylsulfonyl- | 5'-sulfo-2'-methyl-1',3'- | 4 | navy blue |

-continued

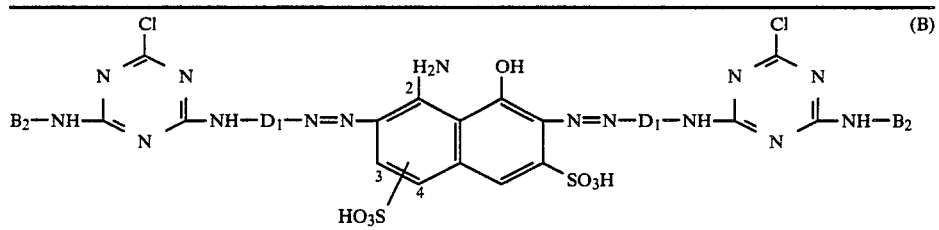

| Example | B₂ | D₁ | Position of HO₃S | Shade on cotton |
|---|---|---|---|---|
| 138 | 3″-(β-sulfato-ethylsulfonyl-methyl)-phenyl | 4′-methyl-1′,3′-phenylene | 4 | black |
| 139 | 3″-(β-sulfato-ethylsulfonyl-methyl)-phenyl | 4′-methoxy-1′,3′-phenylene | 4 | black |
| 140 | 3″-(β-sulfato-ethylsulfonyl-methyl)-phenyl | 4′,8′-disulfo-2′,6′-naphthylene | 4 | navy blue |
| 141 | 3″-(β-sulfato-ethylsulfonyl-methyl)-phenyl | 3′,7′-disulfo-1′,5′-naphthylene | 4 | navy blue |
| 142 | 3″-(β-sulfato-ethylsulfonyl-methyl)-phenyl | p-phenylene | 4 | greenish-tinged black |
| 143 | 3″-(β-sulfato-ethylsulfonyl-methyl)-phenyl | m-phenylene | 4 | black |
| 144 | 3″-(β-sulfato-ethylsulfonyl-methyl)-phenyl | 2′,5′-disulfo-1′,4′-phenylene | 4 | greenish-tinged black |
| 145 | 6″-methyl-3″-(β-sulfatoethyl-sulfonyl)-phenyl | 4′,6′-disulfo-1′,3′-phenylene | 3 | navy blue |
| 146 | 6″-methyl-3″-(β-sulfatoethyl-sulfonyl)-phenyl | 5′-sulfo-2′-methyl-1′,3′-phenylene | 3 | navy blue |
| 147 | 6″-methyl-3″-(β-sulfatoethyl-sulfonyl)-phenyl | 4′-methyl-1′,3′-phenylene | 3 | black |
| 148 | 6″-methyl-3″-(β-sulfatoethyl-sulfonyl)-phenyl | 4′-methoxy-1′,3′-phenylene | 3 | black |
| 149 | 6″-methyl-3″-(β-sulfatoethyl-sulfonyl)-phenyl | 4′,8′-disulfo-2′,6′-naphthylene | 3 | navy blue |
| 150 | 6″-methyl-3″-(β-sulfatoethyl-sulfonyl)-phenyl | 3′,7′-disulfo-1′,5′-naphthylene | 3 | navy blue |
| 151 | 6″-methyl-3″-(β-sulfatoethyl-sulfonyl)-phenyl | p-phenylene | 3 | greenish-tinged black |
| 152 | 6″-methyl-3″-(β-sulfatoethyl-sulfonyl)-phenyl | m-phenylene | 3 | black |
| 153 | 6″-methyl-3″-(β-sulfatoethyl-sulfonyl)-phenyl | 4′,6′-disulfo-1′,3′-phenylene | 4 | navy blue |
| 154 | 6″-methyl-3″-(β-sulfatoethyl-sulfonyl)-phenyl | 5′-sulfo-2′-methyl-1′,3′-phenylene | 4 | navy blue |
| 155 | 6″-methyl-3″-(β-sulfatoethyl-sulfonyl)-phenyl | 4′-methyl-1′,3′-phenylene | 4 | black |
| 156 | 6″-methyl-3″-(β-sulfatoethyl-sulfonyl)-phenyl | 4′-methoxy-1′,3′-phenylene | 4 | black |
| 157 | 6″-methyl-3″-(β-sulfatoethyl-sulfonyl)-phenyl | 4′,8′-disulfo-2′,6′-naphthylene | 4 | navy blue |
| 158 | 6″-methyl-3″-(β-sulfatoethyl-sulfonyl)-phenyl | 3′,7′-disulfo-1′,5′-naphthylene | 4 | navy blue |
| 159 | 6″-methyl-3″-(β-sulfatoethyl-sulfonyl)-phenyl | p-phenylene | 4 | greenish-tinged black |
| 160 | 6″-methyl-3″-(β-sulfatoethyl- | m-phenylene | 4 | black |

-continued

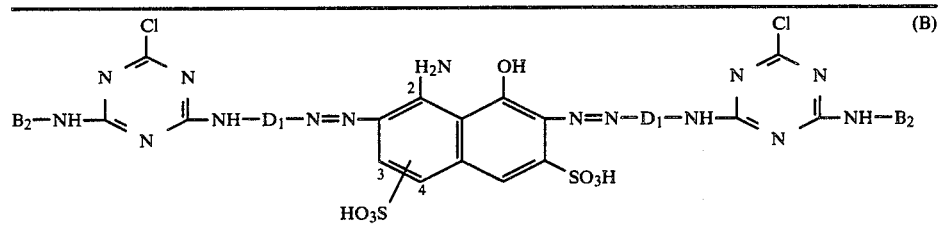
(B)

| Example | B₂ | D₁ | Position of HO₃S | Shade on cotton |
|---|---|---|---|---|
|  | sulfonyl)-phenyl |  |  |  |
| 161 | 6″-methyl-3″-(β-sulfatoethyl-sulfonyl)-phenyl | 2′,5′-disulfo-1′,4′-phenylene | 4 | greenish-tinged black |
| 162 | 4″,6″-dimethoxy-3″-(β-sulfato-ethylsulfonyl)-phenyl | 4′,6′-disulfo-1′,3′-phenylene | 3 | navy blue |
| 163 | 4″,6″-dimethoxy-3″-(β-sulfato-ethylsulfonyl)-phenyl | 5′-sulfo-2′-methyl-1′,3′-phenylene | 3 | navy blue |
| 164 | 4″,6″-dimethoxy-3″-(β-sulfato-ethylsulfonyl)-phenyl | 4′-methyl-1′,3′-phenylene | 3 | black |
| 165 | 4″,6″-dimethoxy-3″-(β-sulfato-ethylsulfonyl)-phenyl | 4′-methoxy-1′,3′-phenylene | 3 | black |
| 166 | 4″,6″-dimethoxy-3″-(β-sulfato-ethylsulfonyl)-phenyl | 4′,8′-disulfo-2′,6′-naphthylene | 3 | navy blue |
| 167 | 4″,6″-dimethoxy-3″-(β-sulfato-ethylsulfonyl)-phenyl | 3′,7′-disulfo-1′,5′-naphthylene | 3 | navy blue |
| 168 | 4″,6″-dimethoxy-3″-(β-sulfato-ethylsulfonyl)-phenyl | p-phenylene | 3 | greenish-tinged black |
| 169 | 4″,6″-dimethoxy-3″-(β-sulfato-ethylsulfonyl)-phenyl | m-phenylene | 3 | black |
| 170 | 4″,6″-dimethoxy-3″-(β-sulfato-ethylsulfonyl)-phenyl | 4′,6′-disulfo-1′,3′-phenylene | 4 | navy blue |
| 171 | 4″,6″-dimethoxy-3″-(β-sulfato-ethylsulfonyl)-phenyl | 5′-sulfo-2′-methyl-1′,3′-phenylene | 4 | navy blue |
| 172 | 4″,6″-dimethoxy-3″-(β-sulfato-ethylsulfonyl)-phenyl | 4′-methyl-1′,3′-phenylene | 4 | black |
| 173 | 4″,6″-dimethoxy-3″-(β-sulfato-ethylsulfonyl)-phenyl | 4′-methoxy-1′,3′-phenylene | 4 | black |
| 174 | 4″,6″-dimethoxy-3″-(β-sulfato-ethylsulfonyl)-phenyl | 4′,8′-disulfo-2′,6′-naphthylene | 4 | navy blue |
| 175 | 4″,6″-dimethoxy-3″-(β-sulfato-ethylsulfonyl)-phenyl | 3′,7′-disulfo-1′,5′-naphthylene | 4 | navy blue |
| 176 | 4″,6″-dimethoxy-3″-(β-sulfato-ethylsulfonyl) | p-phenylene | 4 | greenish-tinged black |
| 177 | 4″,6″-dimethoxy-3″-(β-sulfato-ethylsulfonyl)-phenyl | m-phenylene | 4 | black |
| 178 | 4″,6″-dimethoxy-3″-(β-sulfato- | 2′,5′-disulfo-1′,4′-phenylene | 4 | greenish-tinged |

-continued

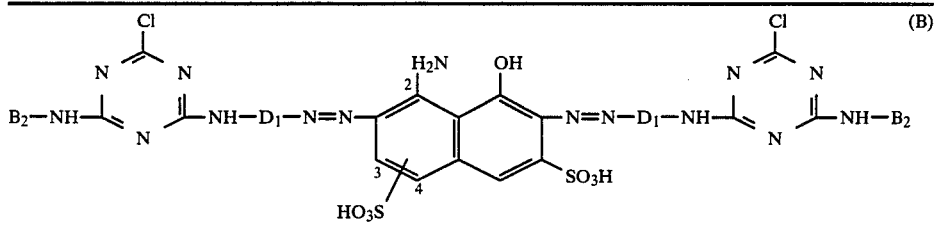

| Example | B₂ | D₁ | Position of HO₃S | Shade on cotton |
|---|---|---|---|---|
| | ethylsulfonyl)-phenyl | | | black |
| 179 | 4''-methoxy-3''-(β-sulfatoethyl-sulfonyl)-phenyl | 4',6'-disulfo-1',3'-phenylene | 3 | navy blue |
| 180 | 4''-methoxy-3''-(β-sulfatoethyl-sulfonyl)-phenyl | 5'-sulfo-2'-methyl-1',3'-phenylene | 3 | navy blue |
| 181 | 4''-methoxy-3''-(β-sulfatoethyl-sulfonyl)-phenyl | 4'-methyl-1',3'-phenylene | 3 | black |
| 182 | 4''-methoxy-3''-(β-sulfatoethyl-sulfonyl)-phenyl | 4'-methoxy-1',3'-phenylene | 3 | black |
| 183 | 4''-methoxy-3''-(β-sulfatoethyl-sulfonyl)-phenyl | 4',8'-disulfo-2',6'-naphthylene | 3 | navy blue |
| 184 | 4''-methoxy-3''-(β-sulfatoethyl-sulfonyl)-phenyl | 3',7'-disulfo-1',5'-naphthylene | 3 | navy blue |
| 185 | 4''-methoxy-3''-(β-sulfatoethyl-sulfonyl)-phenyl | p-phenylene | 3 | greenish-tinged black |
| 186 | 4''-methoxy-3''-(β-sulfatoethyl-sulfonyl)-phenyl | m-phenylene | 3 | black |
| 187 | 4''-methoxy-3''-(β-sulfatoethyl-sulfonyl)-phenyl | 4',6'-disulfo-1',3'-phenylene | 4 | navy blue |
| 188 | 4''-methoxy-3''-(β-sulfatoethyl-sulfonyl)-phenyl | 5'-sulfo-2'-methyl-1',3'-phenylene | 4 | navy blue |
| 189 | 4''-methoxy-3''-(β-sulfethyl sulfonyl)-phenyl | 4'-methyl-1',3'-phenylene | 4 | black |
| 190 | 4''-methoxy-3''-(β-sulfatoethyl-sulfonyl)-phenyl | 4'-methoxy-1',3'-phenylene | 4 | black |
| 191 | 4''-methoxy-3''-(β-sulfatoethyl-sulfonyl)-phenyl | 4',8'-disulfo-2',6'-naphthylene | 4 | navy blue |
| 192 | 4''-methoxy-3''-(β-sulfatoethyl-sulfonyl)-phenyl | 3',7'-disulfo-1',5'-naphthylene | 4 | navy blue |
| 193 | 4''-methoxy-3''-(β-sulfatoethyl-sulfonyl)-phenyl | p-phenylene | 4 | greenish-tinged black |
| 194 | 4''-methoxy-3''-(β-sulfatoethyl-sulfonyl)-phenyl | m-phenylene | 4 | black |
| 195 | 4''-methoxy-3''-(β-sulfatoethyl-sulfonyl)-phenyl | 2',5'-disulfo-1',4'-phenylene | 4 | greenish-tinged black |
| 196 | 1''-sulfo-6''-(β-sulfatoethyl-sulfonyl)-2''-naphthyl | 4',6'-disulfo-1',3'-phenylene | 3 | navy blue |
| 197 | 1''-sulfo-6''-(β-sulfatoethyl-sulfonyl)-2''-naphthyl | 5'-sulfo-2'-methyl-1',3'-phenylene | 3 | navy blue |
| 198 | 1''-sulfo-6''-(β-sulfatoethyl-sulfonyl)-2''-naphthyl | 4'-methyl-1',3'-phenylene | 3 | black |
| 199 | 1''-sulfo-6''-(β-sulfatoethyl-sulfonyl)-2''-naphthyl | 4'-methoxy-1',3'-phenylene | 3 | black |

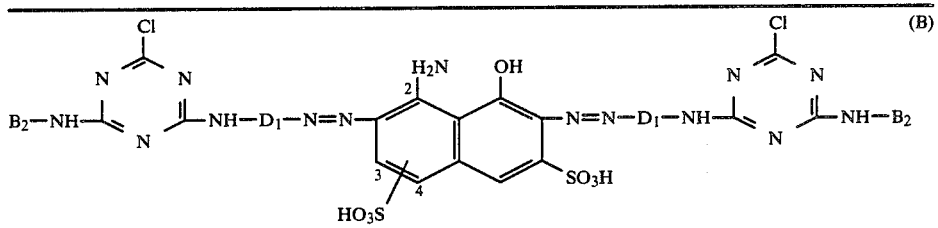

| Example | $B_2$ | $D_1$ | Position of $HO_3S$ | Shade on cotton |
|---|---|---|---|---|
| 200 | 1''-sulfo-6''-(β-sulfatoethyl-sulfonyl)-2''-naphthyl | 4',8'-disulfo-2',6'-naphthylene | 3 | navy blue |
| 201 | 1''-sulfo-6''-(β-sulfatoethyl-sulfonyl)-2''-naphthyl | 3',7'-disulfo-1',5'-naphthylene | 3 | navy blue |
| 202 | 1''-sulfo-6''-(β-sulfatoethyl-sulfonyl)-2''-naphthyl | p-phenylene | 3 | greenish-tinged black |
| 203 | 1''-sulfo-6''-(β-sulfatoethyl-sulfonyl)-2''-naphthyl | m-phenylene | 3 | black |
| 204 | 1''-sulfo-6''-(β-sulfatoethyl-sulfonyl)-2''-naphthyl | 4',6'-disulfo-1',3'-phenylene | 4 | navy blue |
| 205 | 1''-sulfo-6''-(β-sulfatoethyl-sulfonyl)-2''-naphthyl | 5'-sulfo-2'-methyl-1',3'-phenylene | 4 | navy blue |
| 206 | 1''-sulfo-6''-(β-sulfatoethyl-sulfonyl)-2''-naphthyl | 4'-methyl-1',3'-phenylene | 4 | black |
| 207 | 1''-sulfo-6''-(β-sulfatoethyl-sulfonyl)-2''-naphthyl | 4'-methoxy-1',3'-phenylene | 4 | black |
| 208 | 1''-sulfo-6''-(β-sulfatoethyl-sulfonyl)-2''-naphthyl | 4',8'-disulfo-2',6'-naphthylene | 4 | navy blue |
| 209 | 1''-sulfo-6''-(β-sulfatoethyl-sulfonyl)-2''-naphthyl | 3',7'-disulfo-1',5'-naphthylene | 4 | navy blue |
| 210 | 1''-sulfo-6''-(β-sulfatoethyl-sulfonyl)-2''-naphthyl | p-phenylene | 4 | greenish-tinged black |
| 211 | 1''-sulfo-6''-(β-sulfatoethyl-sulfonyl)-2''-naphthyl | m-phenylene | 4 | black |
| 212 | 1''-sulfo-6''-(β-sulfatoethyl-sulfonyl)-2''-naphthyl | 2',5'-disulfo-1',4'-phenylene | 4 | greenish-tinged black |
| 213 | 6''-sulfo-8''-(β-sulfatoethyl-sulfonyl)-2''-naphthyl | 4',6'-disulfo-1',3'-phenylene | 3 | navy blue |
| 214 | 6''-sulfo-8''-(β-sulfatoethyl-sulfonyl)-2''-naphthyl | 5'-sulfo-2'-methyl-1',3'-phenylene | 3 | navy blue |
| 215 | 6''-sulfo-8''-(β-sulfatoethyl-sulfonyl)-2''-naphthyl | 4'-methyl-1',3'-phenylene | 3 | black |
| 216 | 6''-sulfo-8''-(β-sulfatoethyl-sulfonyl)-2''-naphthyl | 4'-methoxy-1',3'-phenylene | 3 | black |
| 217 | 6''-sulfo-8''-(β-sulfatoethyl-sulfonyl)-2''- | 4',8'-disulfo-2',6'-naphthylene | 3 | navy blue |

-continued $$B_2-NH-\underset{N}{\overset{Cl}{\underset{\|}{C}}}\!\!\!\overset{N}{\underset{\|}{\overset{\|}{C}}}\!\!-NH-D_1-N=N-\underset{HO_3S}{\overset{H_2N\ \ OH}{\underset{\overset{|}{4}}{\overset{2}{\bigodot\!\bigodot}}}}\!\!-N=N-D_1-NH-\underset{N}{\overset{Cl}{\underset{\|}{C}}}\!\!\!\overset{N}{\underset{\|}{\overset{\|}{C}}}\!\!-NH-B_2 \quad (B)$$

| Example | $B_2$ | $D_1$ | Position of $HO_3S$ | Shade on cotton |
|---|---|---|---|---|
| 218 | 6''-sulfo-8''-(β-sulfatoethyl-sulfonyl)-2''-naphthyl | 3',7'-disulfo-1',5'-naphthylene | 3 | navy blue |
| 219 | 6''-sulfo-8''-(β-sulfatoethyl-sulfonyl)-2''-naphthyl | p-phenylene | 3 | greenish-tinged black |
| 220 | 6''-sulfo-8''-(β-sulfatoethyl-sulfonyl)-2''-naphthyl | m-phenylene | 3 | black |
| 221 | 6''-sulfo-8''-(β-sulfatoethyl-sulfonyl)-2''-naphthyl | 4',6'-disulfo-1',3'-phenylene | 4 | navy blue |
| 222 | 6''-sulfo-8''-(β-sulfatoethyl-sulfonyl)-2''-naphthyl | 5'-sulfo-2'-methyl-1',3'-phenylene | 4 | navy blue |
| 223 | 6''-sulfo-8''-(β-sulfatoethyl-sulfonyl)-2''-naphthyl | 4'-methyl-1',3'-phenylene | 4 | black |
| 224 | 6''-sulfo-8''-(β-sulfatoethyl-sulfonyl)-2''-naphthyl | 4'-methoxy-1',3'-phenylene | 4 | black |
| 225 | 6''-sulfo-8''-(β-sulfatoethyl-sulfonyl)-2''-naphthyl | 4',8'-disulfo-2',6'-naphthylene | 4 | navy blue |
| 226 | 6''-sulfo-8''-(β-sulfatoethyl-sulfonyl)-2''-naphthyl | 3',7'-disulfo-1',5'-naphthylene | 4 | navy blue |
| 227 | 6''-sulfo-8''-(β-sulfatoethyl-sulfonyl)-2''-naphthyl | p-phenylene | 4 | greenish-tinged black |
| 228 | 6''-sulfo-8''-(β-sulfatoethyl-sulfonyl)-2''-naphthyl | m-phenylene | 4 | black |
| 229 | 6''-sulfo-8''-(β-sulfatoethyl-sulfonyl)-2''-naphthyl | 2',5'-disulfo-1',4'-phenylene | 4 | greenish-tinged black |

EXAMPLE 230

A neutral solution of 28.1 parts of aniline-4-β-sulfatoethylsulfone in 100 parts of water is poured, with stirring, into a suspension which is obtained by stirring a solution of 19.5 parts of cyanuric chloride in 100 parts by volume of acetone into a mixture of 200 parts of water and 200 parts of ice. This reaction mixture is stirred for one hour at 0° to 5° C. and at a pH value of 3 to 4, about 8.4 parts of sodium bicarbonate being added to maintain the pH value. Subsequently, a neutral solution of 26.8 parts of 1,4-diaminobenzene-2,5-disulfonic acid in 200 parts of water is added to the resulting suspension of the primary condensation product; this reaction mixture is stirred for about 18 hours at 25° to 28° C. and at a pH value of 6.5 to 7.2. The secondary reaction product formed gives a clear solution. 250 parts of ice and 60 parts by volume of 31% strength aqueous hydrochloric acid are added to this solution and the subsequent diazotization is effected by the dropwise addition of 20 parts by volume of aqueous 5N sodium nitrite solution at a temperature 0° to 5° C. The diazonium salt solution obtained is then added dropwise at a pH value of 2.5 to 3.0 and at a temperature of 0° to 10° C. to a solution of 31.9 parts of 1-amino-8-naphthol-3,6-disulfonic acid in 1,500 parts of water, the pH value being maintained between 2.5 to 3.0 by the addition in portions of 63 parts of crystalline sodium acetate. After the coupling is complete, the monoazo compound formed is precipitated by means of potassium chloride and filtered off under suction.

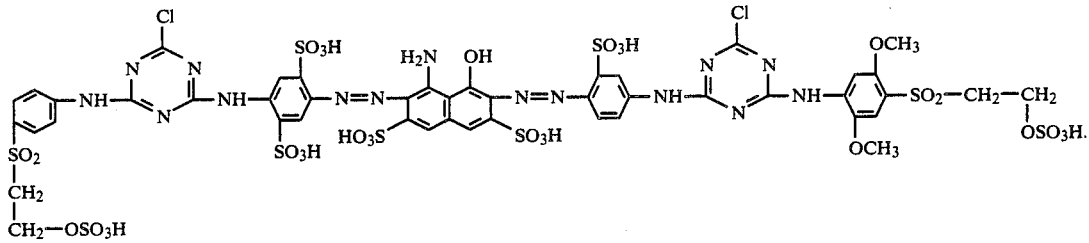

The moist filter cake of the monoazo compound is dissolved in 500 parts of water, and to this solution a diazonium salt solution is added, which is prepared as indicated in the following text: a solution of 19.5 parts of cyanuric chloride in 100 parts by volume of acetone is allowed to flow, whilst stirring, into a mixture of 200 parts of water and 200 parts of ice. A neutral solution of 34.1 parts of 2,5-dimethoxyaniline-4-β-sulfatoethylsulfone in a mixture of 140 parts of water and 60 parts of ice is added to this suspension; the condensation is carried out at a pH value of 3.0 to 4.5, which is maintained by means of sodium bicarbonate. After stirring for one hour, a neutral solution of 18.8 parts of 1,4-diaminobenzene-2-sulfonic acid in 200 parts of water is added to the primary condensation product so prepared and the second condensation reaction is carried out over 10 hours at a pH value of 6.2 to 6.8 and at a temperature of 28° to 30° C. 40 parts by volume of 31% strength hydrochloric acid are then added to the solution of the secondary condensation product obtained, the mixture is cooled to 0° to 5° C. and the diazotization is carried out by means of 20 parts by volume of aqueous 5N sodium nitrite solution. This diazonium salt solution is adjusted to a pH value of 5.5 to 5.8 using sodium bicarbonate and, as mentioned above, is added to the solution of the monoazo compound.

This second coupling reaction is carried out at a pH value of 5.5 to 6.5 and at a temperature of 23° to 25° C. The disazo compound formed is precipitated by means of potassium chloride, filtered off under suction, dried and ground. A black powder, which contains electrolyte (predominantly potassium chloride), is obtained, this powder containing the alkali metal salt, predominantly the potassium salt, of the compound of the formula This compound has very good dyestuff properties and yields, using the application and fixing methods customary for fiber-reactive dyestuffs, dyeings and prints on cellulose fiber materials with a greenish-tinged black shade having very good wear and processing fastness properties, such as, in particular, very good wash fastness and fastness to perspiration, water, seawater, acids sand alkalis, and also very good rubbing and pleating fastness properties.

EXAMPLES 231 TO 237

The method according to the invention for preparing the compounds of the general formula (1) according to the invention is used analogously to the information given in Example 230, but, instead of the reaction components given there, the starting components which can be seen in the Examples in the following Table in connection with the general formula (C) (aniline derivatives having the β-sulfatoethylsulfonyl group, cyanuric chloride and a diaminobenzenemonosulfonic acid or diaminobenzenedisulfonic acid for both the secondary condensation products, which serve as diazo components, as well as 1-amino-8-naphthol-3,6-disulfonic acid or 1-amino-8-naphthol-4,6-disulfonic acid as the coupling component) are used. The disazo compounds according to the invention, named in the Examples in the Table with reference to the general formula (C) (thus obtained) have very good dyestuff properties and yield, by the application and fixing methods customary in industry for fiber-reactive dyestuffs, dyeings and prints having good fastness properties, in the shades given in the Examples in the Table.

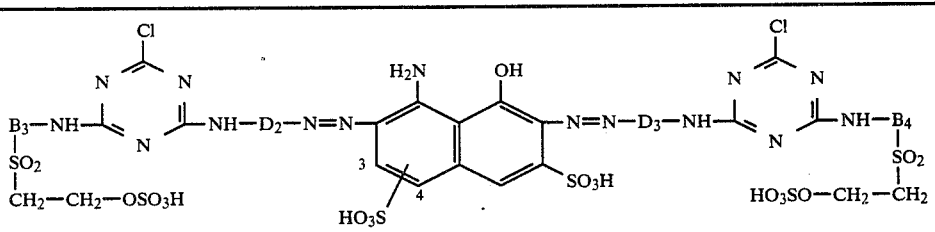

| Example | $B_3$ | $B_4$ | $D_2$ | $D_3$ | Position of $HO_3S$ | Shade on cotton |
|---|---|---|---|---|---|---|
| 231 | ⌬ | ⌬ | ⌬-$SO_3H$ | $HO_3S$-⌬ | 3 | greenish-tinged black |

-continued

Formula (C): Structure with central aminohydroxynaphthalene disulfonic acid core, coupled via azo groups to D2 and D3, each connected through NH to chlorotriazine and then to B3/B4 sulfonyl groups with β-sulfatoethyl/β-sulfatoethyl chains.

| Example | B3 | B4 | D2 | D3 | Position of HO3S | Shade on cotton |
|---|---|---|---|---|---|---|
| 232 | phenyl | 4-methylphenyl | 2-SO3H-phenyl | 4-HO3S-phenyl | 3 | greenish-tinged navy blue |
| 233 | phenyl | 4-methoxyphenyl | 4-SO3H-phenyl | 4-HO3S-phenyl | 3 | navy blue |
| 234 | phenyl | phenyl | 2-SO3H-phenyl | 4-HO3S-phenyl | 3 | navy blue |
| 235 | phenyl | phenyl | 4-SO3H-phenyl | 2,5-di-HO3S-phenyl | 4 | dark blue |
| 236 | phenyl | phenyl | 2-SO3H-phenyl | 2,5-di-HO3S-phenyl | 4 | dark blue |
| 237 | 4-methylphenyl | 4-methoxyphenyl | 4-SO3H-phenyl | 4-HO3S-phenyl | 3 | navy blue |

EXAMPLE 238

The method given in Example 1 is used, but aniline-4-β-sulfatoethylsulfone is replaced in each case by the equivalent amount (29.7 parts) of aniline-4-β-thiosulfatoethylsulfone. A dyestuff powder which contains electrolyte is obtained, this powder containing the alkali metal salt of the compound of the formula

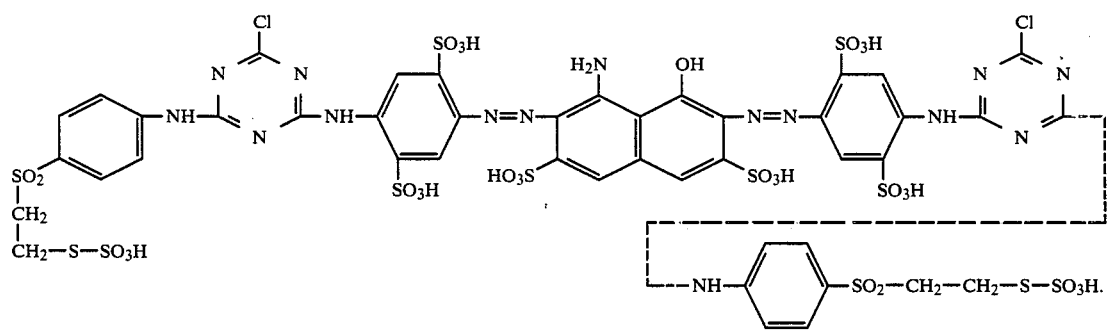

This disazo compound is also a very good dyestuff, which in comparison with the dyestuff of Example 1 has similarly good coloristic properties and fastness properties. It can be used on natural and synthetic polyamide fiber materials, but in particular, on natural and regenerated cellulose fiber materials, such as preferably cotton, according to the methods of application and fixing customary in particular for fiber-reactive dyestuffs.

EXAMPLE 239

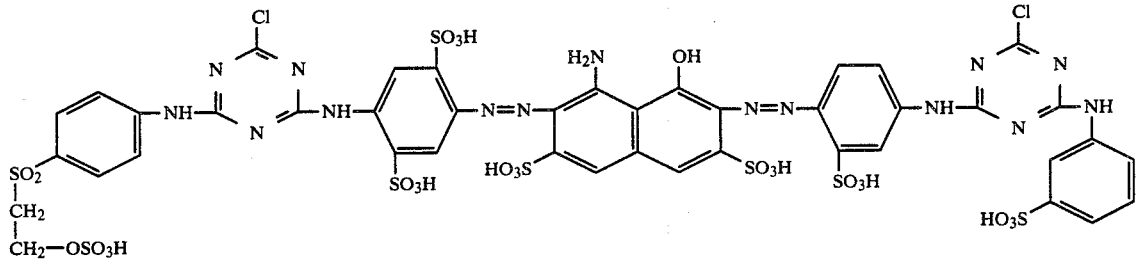

The monoazo compound is prepared according to the information of Example 1 and is dissolved in 500 parts of water. The second coupling reaction is carried out with another diazonium compound which is prepared as follows: a solution of 19.5 parts of cyanuric chloride in 100 parts by volume of acetone is stirred into a mixture of 200 parts of water and 100 parts of ice. A solution of 17.3 parts of aniline-3-sulfonic acid in 100 parts of water and 50 parts by volume of an aqueous 5N sodium hydroxide solution is added to this suspension; the condensation reaction is carried out at 0° C. and at a pH value of 3 to 4, this pH being maintained by means of sodium bicarbonate. After one hour a neutral solution of 18.8 parts of 1,4-diaminobenzene-2-sulfonic acid in 200 parts of water is added and the second condensation reaction is allowed to take place, whilst stirring for several hours, at a pH value of 5.5 to 6.5 and a temperature of 25° to 28° C. After the condensation is completed the solution is filtered, and acidified with 35 parts by volume of 31% strength aqueous hydrochloric acid, 500 parts of ice are added and the diazotization is carried out with a slow addition of 20 parts by volume of aqueous 5N sodium nitrite solution. As is customary, excess nitrous acid is then destroyed with a little amidosulfonic acid. The diazonium salt suspension is then adjusted to a pH value of 5.5 to 6.5 using 17.8 parts of sodium bicarbonate and, as mentioned above, is coupled with the solution of the monoazo compound at a pH value of 5.5 to 6.5. The diazo compound formed is salted out with potassium chloride, filtered off under sunction and dried. A black dyestuff powder, which contains electrolyte (predominantly potassium chloride) is obtained, this powder containing about 40 to 45% of the alkali metal salt, predominantly the potassium salt, of the compound of the formula This compound exhibits very good dyestuff properties and yields, when applied and fixed according to the methods customary for fiber-reactive dyestuffs, greenish-tinged black dyeings and prints on cellulose fibers, such as cotton, having very good end-use and processing fastness properties, such as, for example, the very good wash fastness and fastness to perspiration, rubbing, acids and alkalis.

EXAMPLES 240 TO 255

The method according to the invention for preparing the compounds of the general formula (1) according to the invention is used analogously to the information given in Example 239, but, instead of the reaction components given there, the starting components which can be seen in the Examples in the following table in connection with the general formulae (D) and (E) (aniline derivatives having a β-sulfatoethylsulfonyl group or not, cyanuric chloride and a diaminobenzene compound for both these secondary condensation products, which serve as the diazo component, as well as 1-amino-8-naphthol-3,6-disulfonic acid or 1-amino-8-naphthol-4,6-disulfonic acid as the coupling component) are used. The diazo compounds according to the invention, named in the Examples in the Table with reference to the general formulae (D) and (E) have very good dyestuff properties and yield, by the application and fixing methods customary in industry for fiber-reactive dyestuffs, dyeings and prints having good fastness properties, in the shades given in the Examples in the Table.

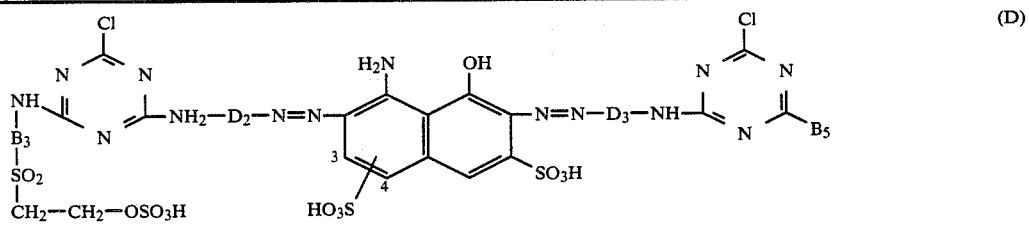

| Example | B3 | D2 | D3 | B5 | Position of HO3S— | Shade on cotton |
|---|---|---|---|---|---|---|
| 240 | ⌬— | ⌬-SO3H | ⌬-SO3H (with SO3H) | —NH—⌬-SO3H | 3 | greenish-tinged black |

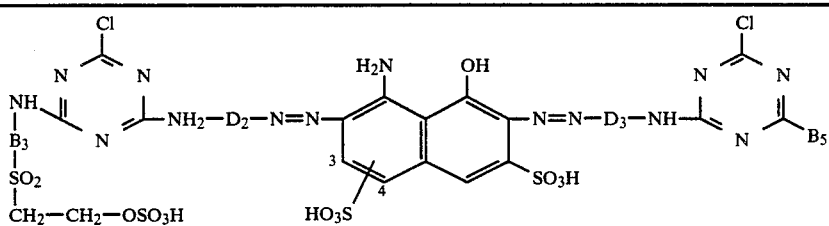

(D)

| Example | B₃ | D₂ | D₃ | B₅ | Position of HO₃S— | Shade on cotton |
|---|---|---|---|---|---|---|
| 241 | –⟨C₆H₄⟩– | " | " | –N(CH₃)(C₆H₅) | 3 | greenish-tinged black |
| 242 | –⟨C₆H₄⟩– | " | 2,5-(SO₃H)-C₆H₃– | –N(CH₃)CH₂CH₂SO₃H | 3 | greenish-tinged navy blue |
| 243 | –⟨C₆H₄⟩– | 2,5-(SO₃H)₂-C₆H₃– | " | –NH₂ | 3 | black |
| 244 | 4-OCH₃-C₆H₄– | 4-SO₃H-C₆H₄– | 2,5-(SO₃H)₂-C₆H₃– | –N(C₂H₅)₂ | 3 | reddish-tinged navy blue |
| 245 | –⟨C₆H₄⟩– | 2,5-(SO₃H)₂-C₆H₃– | 2-Cl-C₆H₄– | –N(CH₃)CH₂CH₂OH | 3 | dark blue |
| 246 | –⟨C₆H₄⟩– | 2-CH₃-C₆H₄– | 2,5-(SO₃H)₂-C₆H₃– | –HN–CH(COOH)CH₂– | 4 | navy blue |
| 247 | –⟨C₆H₄⟩– | 4-SO₃H-C₆H₄– | 4-SO₃H-C₆H₄– | –NH-(3-SO₃H-C₆H₄) | 3 | black |

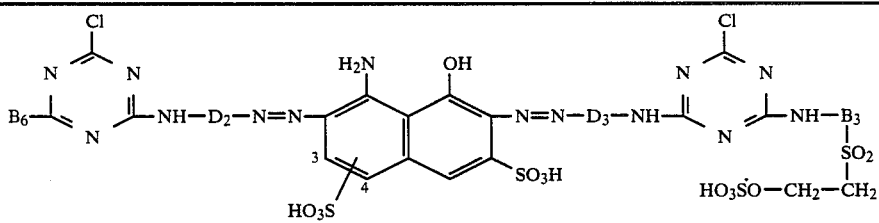

(E)

| Example | B₆ | D₂ | D₃ | B₃ | Position of HO₃S— | Shade on cotton |
|---|---|---|---|---|---|---|
| 248 | HOOC-CH(NH–)CH₂– | 2-SO₃H-C₆H₃– | 2-SO₃H-C₆H₃– | –⟨C₆H₄⟩– | 3 | greenish-tinged navy blue |
| 249 | 3-SO₃H-C₆H₄-NH– | 4-SO₃H-C₆H₄– | 4-SO₃H-C₆H₄– | –⟨C₆H₄⟩– | 3 | black |

-continued (E)

[Structure: Bis-triazinyl disazo dye with central H₂N/OH-naphthalene disulfonic acid core, where B₆—NH—D₂—N=N— couples on one side to the naphthalene (with HO₃S at position 3 or 4), and —N=N—D₃—NH—triazine(Cl)—NH—B₃ on the other side, with B₃ bearing —SO₂—CH₂—CH₂—OSO₃H]

| Example | B₆ | D₂ | D₃ | B₃ | Position of HO₃S— | Shade on cotton |
|---|---|---|---|---|---|---|
| 250 | 3-HO₃S-C₆H₄-NH— | 2,5-(SO₃H)₂-C₆H₃— | 2-SO₃H-C₆H₄— | C₆H₅— | 3 | navy blue |
| 251 | H₂N— | 4-SO₃H-C₆H₄— | 4-HO₃S-C₆H₄— | C₆H₅— | 3 | navy blue |
| 252 | C₆H₅-N(CH₃)— | 2-SO₃H-C₆H₄— | 2-SO₃H-C₆H₄— | C₆H₅— | 3 | greenish-tinged navy blue |
| 253 | HO₃S-CH₂-CH₂-N(CH₃)— | " | 2,5-(SO₃H)₂-C₆H₃— | 4-CH₃O-C₆H₄— | 3 | greenish-tinged navy blue |
| 254 | HO-CH₂-CH₂-N(CH₃)— | 2,5-(SO₃H)₂-C₆H₃— | 2-Cl-C₆H₄— | C₆H₅— | 4 | dark blue |
| 255 | 3-HO₃S-C₆H₄-NH— | 2,4-(HO₃S)(SO₃H)-C₆H₃— | 2-SO₃H-C₆H₄— | 4-CH₃-C₆H₄— | 3 | black |

EXAMPLE 256

The monoazo compound is prepared according to the information of Example 1 and is dissolved in 500 parts of water. The second coupling reaction is carried out with a diazonium salt which is prepared as described in the following text: 28.1 parts of aniline-4-β-sulfatoethylsulfone are suspended in a mixture of 100 parts of water and 50 parts of ice and dissolved to give a neutral solution by the addition of 7.3 parts of sodium carbonate. Then 20.3 parts by volume of aqueous 5N sodium nitrite solution are added and this mixture is allowed to run onto a mixture of 26 parts by volume of aqueous 31% strength hydrochloric acid and 150 parts of ice. The suspension obtained is stirred for a further hour, excess nitrous acid is then destroyed with amidosulfonic acid and the reaction product is adjusted to a pH value of 5.7 to 6.2 using 7 parts of sodium bicarbonate.

The solution of the monoazo compound is, as mentioned above, added to the diazonium salt suspension so prepared, the pH value being maintained at 5.7 to 6.2 by the addition in portions of 16.3 parts of sodium bicarbonate. After stirring for several hours the coupling is complete and the disazo compound formed is salted out with potassium chloride, filtered off under suction and dried.

A black powder, which contains electrolyte, is obtained, this powder containing about 45% of the alkali metal salt, predominantly the potassium salt, of the compound of the formula.

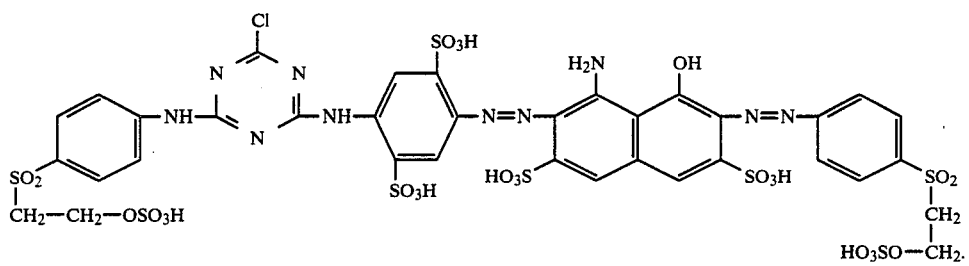

This compound exhibits very good dyestuff properties and yields, according to the application and fixing methods customary for fiber-reactive dyestuffs, strong black dyeings on cellulose fiber materials, these dyeings having very good end-use and processing fastness properties, such as in particular very good wash fastness, seawater fastness and perspiration fastness. Additionally, the dyestuff exhibits a very high degree of fixation and the parts which are not fixed can be washed out readily.

EXAMPLES 257 TO 265

The reaction is carried out in a manner according to the invention, analogous to the method for preparing a disazo compound according to the invention described in the Example 256, but, instead of the reaction components indicated there, the reaction components given in the Examples in the Table below in connection with the general formula (F) (aniline compound having a β-sulfatoethylsulfonyl group, cyanuric chloride and a diaminobenzene compound for preparing the condensation product which serves as the diazo component, 1-amino-8-naphthol-3,6-disulfonic acid or 1-amino-8-naphthol-4,6-disulfonic acid and an aniline compound having a β-sulfatoethylsulfonyl group as the second diazo component) are used. The diazo compounds according to the invention given in the Examples in the Table with reference to the formula (F) likewise have very good dyestuff properties and yield, according to the methods of application and fixation customary for fiber-reactive dyestuffs, intense dyeings and prints on, preferably, cellulose fiber materials, with the shades indicated in the Examples. These dyeings and prints, too, exhibit good fastness properties.

(F)

[Structure of formula (F)]

| Example | B₃ | D₂ | D₄ | Position of HO₃S— | Shade on cotton |
|---|---|---|---|---|---|
| 257 | phenyl | phenyl-SO₃H | phenyl | 3 | black |
| 258 | 3-OCH₃, 4-CH₃ phenyl | " | phenyl-SO₃H | 3 | black |
| 259 | phenyl | " | phenyl-Br | 3 | black |
| 260 | phenyl | phenyl-(SO₃H)₂ | phenyl-Cl₂ | 3 | black |

-continued

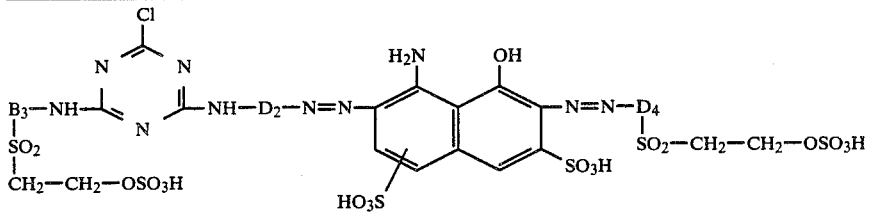
(F)

| Example | B₃ | D₂ | D₄ | Position of HO₃S— | Shade on cotton |
|---|---|---|---|---|---|
| 261 | phenyl | 4-SO₃H-phenyl | 2,5-di-OCH₃-phenyl | 3 | greenish-tinged navy blue |
| 262 | phenyl | " | 2-OCH₃-5-CH₃-phenyl | 3 | navy blue |
| 263 | 2,5-di-OCH₃-phenyl | 2,5-di-SO₃H-phenyl | 4-CH₃-phenyl | 4 | reddish-tinged black |
| 264 | 2-OCH₃-phenyl | 2,5-di-SO₃H-phenyl | 3-OCH₃-phenyl | 3 | black |
| 265 | phenyl | 2-SO₃H-phenyl | phenyl | 3 | black |

EXAMPLE 266

A mixture of a neutral solution of 28.1 parts of aniline-4-β-sulfatoethylsulfone in 150 parts of water and 20.3 parts by volume of an aqueous 5N sodium nitrite solution is allowed to run into a mixture of 26 parts by volume of aqueous 31% strength hydrochloric acid and 150 parts of ice, at 0° to 5° C. and with stirring. The resulting suspension is stirred for a further hour and excess nitrous acid is destroyed with amidosulfonic acid. A solution of 31.9 parts of 1-amino-8-naphthol-3,6-disulfonic acid in 500 parts of water, adjusted to a pH value of 4 by means of hydrochloric acid, is then added to start the coupling reaction. The pH value of the coupling is maintained at 3 to 3.5, using sodium acetate. After the first coupling reaction is completed, the monoazo compound formed is reacted with a diazonium salt solution in the second coupling reaction. This diazonium salt solution is prepared as follows: a neutral solution of 28.1 parts of aniline-4-β-sulfatoethylsulfone in 100 parts of water is poured into a suspension which is obtained by stirring a solution of 19.5 parts of cyanuric chloride in 100 parts by volume of acetone into a mixture of 200 parts of water and 200 parts of ice. The condensation reaction is carried out for an hour at 0° to 5° C. and at a pH value of 3 to 4, with stirring, the pH value being maintained by the addition, in portions, of sodium bicarbonate (about 8.4 parts). A neutral solution of 26.8 parts of 1,4-diaminobenzene-2,5-disulfonic acid in 200 parts of water is then added to the suspension of the primary condensation product thus prepared, and the mixture is stirred for about 18 hours at 25° to 28° C. and at a pH value of 6.5 to 7.2. 250 parts of ice and then 60 parts of aqueous 31% strength hydrochloric acid are added to the clear solution of the secondary condensation product thus obtained, and the condensation product is diazotized at 0° to 5° C. by slowly adding 20 parts by volume of an aqueous 5N sodium nitrite solution.

This diazonium salt solution is adjusted to a pH value of 5.5 to 6 using sodium bicarbonate and, as mentioned above, is coupled with the monoazo compound, the coupling reaction being carried out at a pH value of 5.8 to 6.2 After stirring for several hours, the disazo compound formed is precipitated with potassium chloride, filtered off under suction and dried.

A black powder, which contains electrolyte, is obtained, about 50% of this powder being the alkali metal salt, preferably the potassium salt, of the compound of the formula methods of the illustrative Examples given above, preferably analogous to Example 266, and if for this purpose the corresponding reaction components (as first diazo component an aniline having a β-sulfatoethylsulfonyl group, as second diazo component a reaction product from an aniline compound having a β-sulfatoethylsulfonyl group, cyanuric chloride and a diaminobenzene compound, and as coupling component 1-amino-8-naphthol-3,6-disulfonic acid or 1-amino-8-naphthol-4,6-disulfonic acid) are used and which are indicated in the following Table-Examples in connection with the gen-

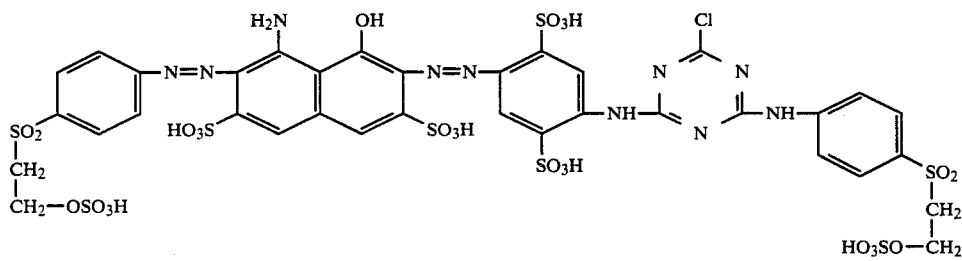

This disazo compound has very good dyestuff properties and dyes, according to the dyeing and printing methods customary for reactive dyestuffs, cellulose fiber materials in black shades having very good end-use and processing fastness properties.

EXAMPLES 267 TO 273

If a method according to the invention for preparing the disazo compounds according to the invention is used, for example the method analogous to one of the eral formula (G), the valuable disazo compounds, which correspond to the general formula (1) and which are characterized in the following Examples in the Table by the formula moieties of the formula (G) indicated therein, are obtained which likewise have very good dyestuff properties and yield, according to the application and fixing methods customary in industry for fiber-reactive dyestuffs, strong fast dyeings and prints on the cellulose fiber materials, with the shades indicated in the Examples.

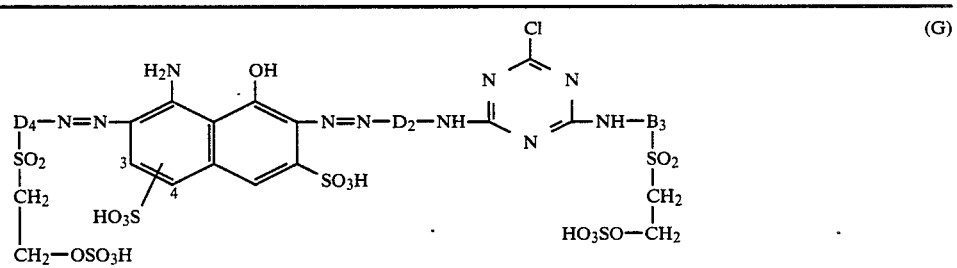

| Example | $D_4$ | $D_2$ | $B_3$ | Position of $HO_3S-$ | Shade on cotton |
|---|---|---|---|---|---|
| 267 | (phenyl with SO$_3$H) | (phenyl with SO$_3$H) | (phenyl) | 3 | black |
| 268 | (phenyl with Br) | (phenyl with SO$_3$H, SO$_3$H) | (phenyl) | 3 | greenish-tinged black |
| 269 | (phenyl) | (phenyl with HO$_3$S) | (phenyl with CH$_3$O) | 3 | navy blue |

(G)

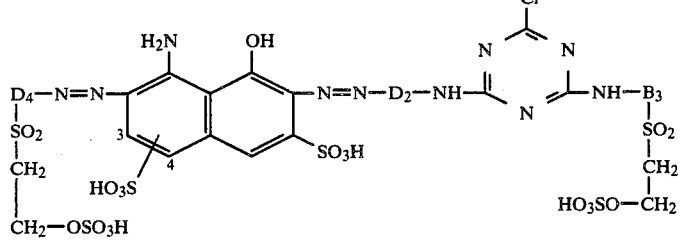

| Example | D4 | D2 | B3 | Position of HO3S— | Shade on cotton |
|---|---|---|---|---|---|
| 270 | 2,4-dichlorophenyl | 3,5-disulfophenyl (HO3S, SO3H) | 2-methoxy-5-methylphenyl (OCH3, CH3) | 3 | dark blue |
| 271 | 4-sulfophenyl (SO3H) | 2-sulfophenyl (SO3H) | phenyl | 4 | navy blue |
| 272 | phenyl | " | 2,5-dimethoxyphenyl (OCH3, OCH3) | 3 | black |
| 273 | phenyl | 2,5-disulfophenyl (SO3H, SO3H) | 4-methylphenyl (CH3) | 4 | black |
| 273a | phenyl | 3-sulfophenyl (HO3S) | phenyl | 3 | navy blue |
| 273b | phenyl | " | phenyl | 3 | navy blue |

EXAMPLE 274

The monoazo compound of Example 266 is prepared and, in order to synthesize the disazo compound from this monoazo compound, the second coupling reaction is carried out according to the information provided in Example 239. After the customary isolation of the dyestuff, the alkali metal salt of the compound of the formula

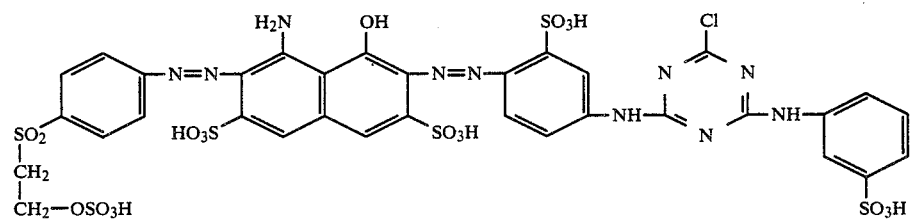

is obtained in the form of a black powder containing electrolyte. This compound exhibits very good dyestuff properties and yields, according to the application and fixation methods customary in industry, black dyeings and prints on cellulose fiber materials having very good end-use and manufacturing fastness properties. Black dyeings having excellent wet fastness properties after an ammonia after-treatment are also obtained on wool from a slightly acid bath.

EXAMPLES 275 TO 280

The method according to the invention for preparing the compounds of the general formula (1) is carried out analogously to one of the abovementioned illustrative Examples, by reacting a diazo component having a β-sulfatoethylsulfonyl group with 1-amino-8-naphthol-3,6-disulfonic acid or 1-amino-8-naphthol-4,6-disulfonic acid, followed by a subsequent coupling with a second diazo component from a condensation product of a diaminobenzene compound with cyanuric chloride and an amino compound. If the starting components given in the following Examples in the Table in connection with the general formula (H) are used for this purpose, disazo compounds according to the invention, of the formula (H), are obtained, which have very valuable fiber-reactive dyestuff properties and which dye cellulose fiber materials, and even wool, in fast hues having the shades indicated.

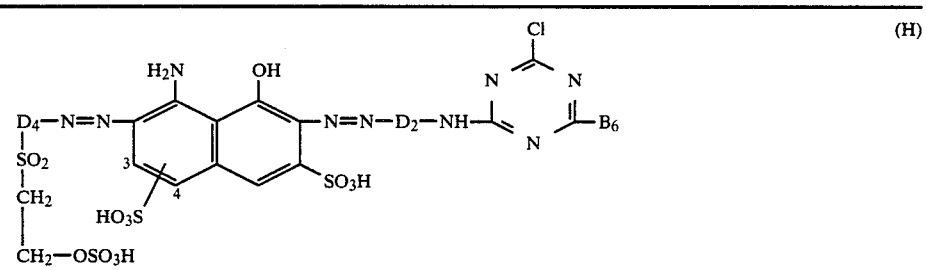

| Example | $D_4$ | $D_2$ | $B_6$ | Position of $HO_3S-$ | Shade on cotton |
|---|---|---|---|---|---|
| 275 | 2-Br-phenyl | 2,5-disulfo-phenyl | $-N(CH_3)-C_6H_5$ | 3 | black |
| 276 | 2-sulfo-phenyl | 2-sulfo-phenyl | $-N(CH_3)-CH_2-CH_2-SO_3H$ | 3 | black |
| 277 | phenyl | 2-sulfo-phenyl | $-NH-CH_2-CH_2-OH$ | 3 | navy blue |
| 278 | 4-sulfo-phenyl | 2-chloro-phenyl | $-NH-CH_2-CH(SO_3H)$ | 3 | black |
| 279 | phenyl | 2-sulfo-phenyl | $-N(C_2H_5)_2$ | 4 | navy blue |
| 280 | 2,4-dichloro-phenyl | 2,5-disulfo-phenyl | $-NH_2$ | 3 | greenish-tinged black |

-continued

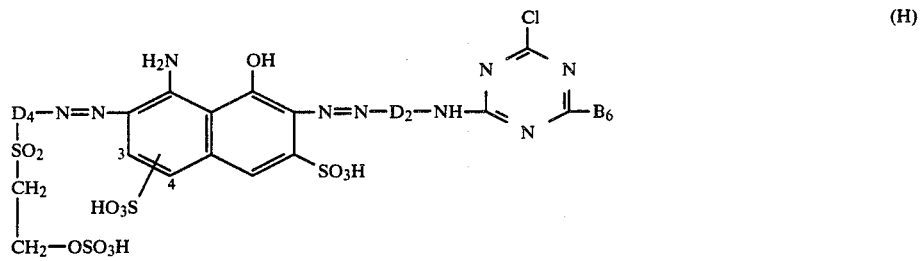

| Example | D4 | D2 | B6 | Position of HO3S— | Shade on cotton |
|---|---|---|---|---|---|
| 280a | (phenyl) | (4-HO3S-phenyl) | —HN-(3-SO3H-phenyl) | 3 | navy blue |

EXAMPLE 281

A solution of 19.5 parts of cyanuric chloride in 100 parts by volume of acetone is stirred into a mixture of 200 parts of water and 100 parts of ice. A solution of 17.3 parts of aniline-3-sulfonic acid, 100 parts of water and 50 parts by volume of an aqueous 2N sodium hydroxide solution is added to the suspension thus obtained. The first condensation reaction is carried out, whilst stirring for one hour, at 0° to 5° C. and at a pH value of 3 to 4. Subsequently, a neutral solution of 18.8 parts of 1,4-diaminobenzene-2-sulfonic acid in 200 parts of water is added; this second condensation reaction is carried out, whilst stirring for several hours, at a pH value of 5.5 to 6.5 and at 25° to 28° C. After the condensation is completed, 35 parts by volume of aqueous 31% strength hydrochloric acid and 500 parts of water are added to the solution, and the diazotization is carried out by the slow addition of 20 parts by volume of an aqueous 5N sodium nitrite solution at a temperature of 0° to 5° C. After destroying excess nitrous acid, the diazonium salt solution is adjusted to a pH value of 2.5 to 3.0 using sodium acetate, and is added slowly (dropwise), in the cold, to a solution of 31.9 parts of 1-amino-8-naphthol-3,6-disulfonic acid in 1,500 parts of water; during this addition the pH value is maintained at 2.5 to 3.0 by means of sodium acetate. After the coupling is completed, the monoazo compound formed is precipitated with potassium chloride and filtered off under suction. The monoazo compound formed is dissolved in 2,000 parts of water, without prior drying. A diazonium salt suspension prepared from 28.1 parts of aniline-4-β-sulfatoethylsulfone (see Example 256) is added to this solution of the monoazo compound at a pH value of 5.5 to 6.5. The coupling reaction is completed at this pH value whilst stirring for several hours, the disazo compound formed is precipitated with sodium chloride, filtered off with suction and dried.

A black powder, which contains electrolyte, is obtained, this powder containing the alkali metal salt, predominantly the sodium salt, of the compound of the formula

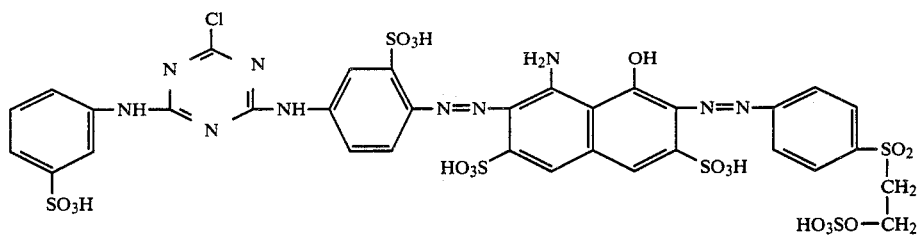

in a proportion of about 50%. This disazo compound has very good fiber-reactive dyestuff properties and dyes, according to the known and customary methods, cellulose fiber materials, such as cotton, in deep black shades having very good end-use and manufacturing fastness properties, such as, in particular, very good fastness to washing, water, perspiration, alkalis and acids.

EXAMPLES 282 TO 292

The procedure followed for preparing an disazo compound according to the invention and corresponding to the general formula (J)

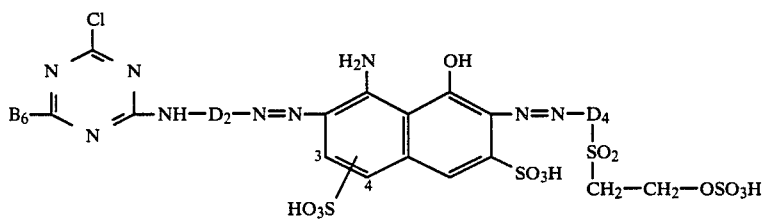

which is characterized in a following Example in the Table by the formula moieties indicated, is analogous to a procedure described in the previous Examples, in that, correspondingly, first a diazo component is prepared, which is the reaction product of an amine, cyanuric chloride and a diaminobenzene compound, this diazo component is then diazotized and coupled with 1-amino-8-naphthol-3,6-disulfonic acid or 1-amino-8-naphthol-4,6-disulfonic acid and the monoazo compound formed from these is reacted with an aniline derivative, as the second diazo component, having a β-sulfatoethylsulfonyl group. These reaction components can be seen in the Examples in the Table in connection with the general formula (J). The disazo compounds according to the invention described in these Examples 282 to 292 likewise exhibit very good fiber-reactive dyestuff properties and yield, for example on cotton materials, fast dyeings having the shades indicated in the Examples.

| Example | $B_6$ | $D_2$ | $D_4$ | Position of $HO_3S-$ | Shade on cotton |
|---|---|---|---|---|---|
| 282 | phenyl-N(CH₃)– | benzene-1,4-di-SO₃H (2-yl) | phenyl | 3 | greenish-tinged navy blue |
| 283 | phenyl-N(C₂H₅)– | " | phenyl | 3 | navy blue |
| 284 | 2-CH₃-phenyl-NH– | SO₃H-phenyl | SO₃H-phenyl | 3 | black |
| 285 | HOCH₂CH₂NH– | " | 2,5-di-OCH₃-phenyl | 3 | greenish-tinged black |
| 286 | 3-SO₃H-phenyl-NH– | 4-SO₃H-phenyl | phenyl | 3 | black |
| 287 | " | " | " | 4 | black |
| 288 | " | " | 2-OCH₃-5-CH₃-phenyl | 3 | black |

-continued

| Example | B₆ | D₂ | D₄ | Position of HO₃S— | Shade on cotton |
|---|---|---|---|---|---|
| 289 | H₂N— | 2,5-disulfophenyl (SO₃H at 1,4-positions) | 2-bromophenyl | 3 | greenish-tinged black |
| 290 | (C₂H₅)₂N— | 2,5-disulfophenyl | 2,3-dichlorophenyl | 3 | black |
| 291 | CH₂—CH₂—N—<br>\|        \|<br>SO₃H   CH₃ | 2-sulfophenyl | 2-chlorophenyl | 3 | black |
| 292 | CH₂—CH₂—NH—<br>\|<br>COOH | " | 2-sulfophenyl | 3 | black |

EXAMPLE 293

The procedure for preparing a disazo compound according to the invention is carried out according to the information given in Example 266, but instead of the aniline-4-β-sulfatoethylsulfone compound 26.5 parts of aniline-4-β-phosphatoethylsulfone are used. The alkali metal salt of the compound of the formula

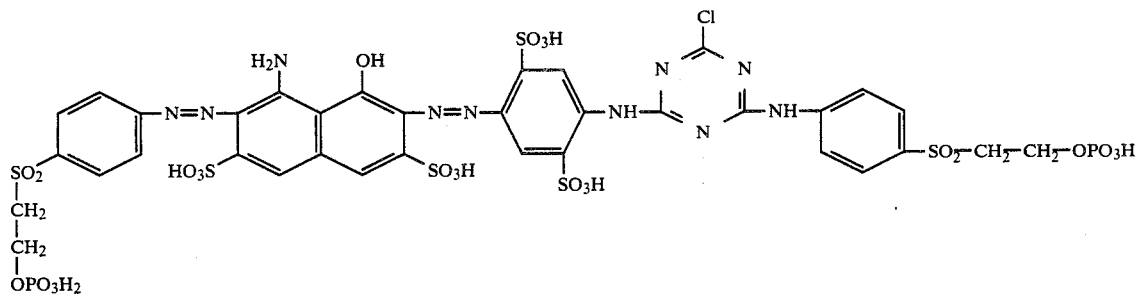

is obtained, which has similarly good dyestuff properties as the disazo dyestuff of Example 266.

We claim:

1. A water-soluble disazo compound of the formula

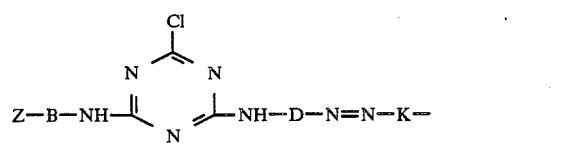

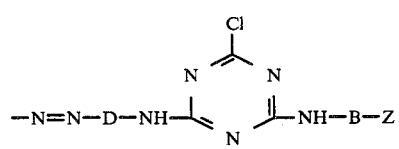

in which

Z is vinylsulfonyl or β-sulfatoethylsulfonyl, and the two formula moieties Z are identical to each other or are different from one another, B is phenylene unsubstituted or substituted by one sulfo or by one methyl or by one methoxy or by one chlorine or by two methoxy or by one methoxy and one methyl, and the two formula moieties B are identical to each other or different from one another, D is phenylene unsubstituted or substituted by one or two sulfo or by one methoxy or by one methyl or by one chlorine or by two methoxy or by one methoxy and one methyl, and the two formula moieties D are identical to each other or different from one another, and K is 1-amino-8-hydroxy-3,6-disulfo-naphth-2,7-ylene or 1-amino-8-hydroxy-4,6-disulfo-naphth-2,7-ylene, or an alkali metal salt thereof.

2. A water-soluble disazo compound of the formula

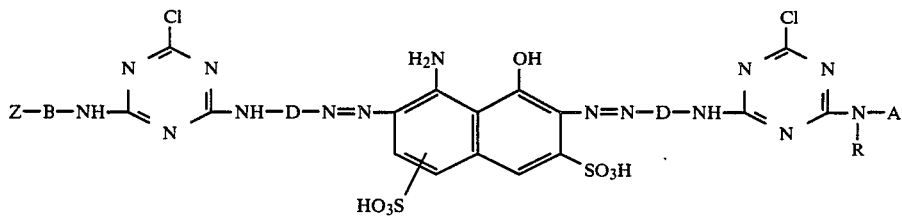

in which
- Z is vinylsulfonyl or β-sulfatoethylsulfonyl, and the two formula moieties Z are identical to each other or are different from one another,
- B is phenylene unsubstituted or substituted by one sulfo or by one methyl or by one methoxy or by one chlorine or by two methoxy or by one methoxy and one methyl, and the two formula moieties B are identical to each other or different from one another,
- D is phenylene unsubstituted or substituted by one or two sulfo or by one methoxy or by one methyl or by one chlorine or by two methoxy or by one methoxy and one methyl, and the two formula moieties D are identical to each other or different from one another,
- R is hydrogen, methyl or ethyl, and
- A is methyl, ethyl, β-hydroxyethyl, β-sulfoethyl, carboxyethyl, β-sulfatoethyl or sulfophenyl, or an alkali metal salt thereof.

4. A water-soluble disazo compound of the formula

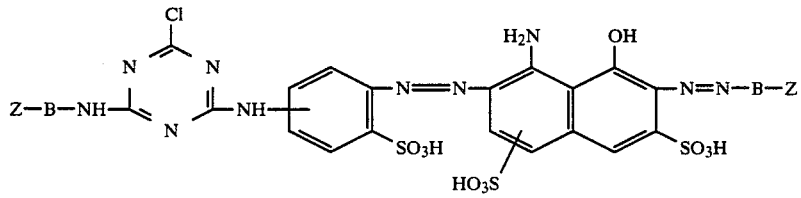

in which
- the free amino bridge is bonded in meta-position or para-position to the azo group,
- B is phenylene unsubstituted or substituted by one sulfo or by one methyl or by one methoxy or by one chlorine or by two methoxy or by one methoxy and one methyl, and the two formula moieties B are identical to each other or different from one another,
- D is phenylene unsubstituted or substituted by one or two sulfo or by one methoxy or by one methyl or by one chlorine or by two methoxy or by one methoxy and one methyl, and the two formula moieties D are identical to each other or different from one another, and
- R is hydrogen, methyl or ethyl, and
- A is methyl, ethyl, β-hydroxyethyl, β-sulfoethyl, carboxyethyl, β-sulfatoethyl or sulfophenyl, or an alkali metal salt thereof.

3. A water-soluble disazo compound of the formula

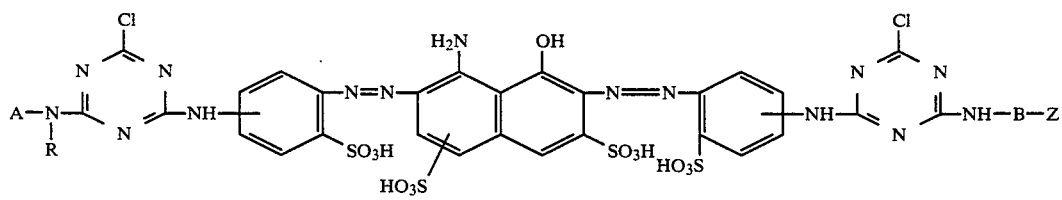

in which
- the two free amino bridges are bonded in meta-position or para-position relative to the azo group,
- Z is vinylsulfonyl or β-sulfatoethylsulfonyl, and the two formula moieties Z are identical to each other or are different from one another,
- B is phenylene unsubstituted or substituted by one sulfo or by one methyl or by one methoxy or by one chlorine or by two methoxy or by one methoxy and one methyl, and the two formula moieties B are identical to each other or different from one another, and
- Z is vinylsulfonyl or β-sulfatoethylsulfonyl, and the two formula moieties Z are identical to each other or are different from one another, or an alkali metal salt thereof.

5. A water-soluble disazo compound of the formula

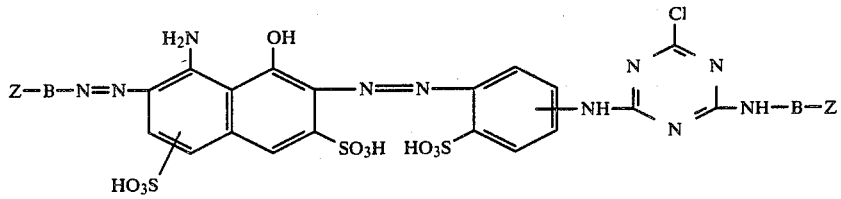

in which
   the free amino bridge is bonded in meta-position or para-position to the azo group,
   B is phenylene unsubstituted or substituted by one sulfo or by one methyl or by one methoxy or by one chlorine or by two methoxy or by one methoxy and one methyl, and the two formula moieties B are identical to each other or different from one another, and
   Z is vinylsulfonyl or β-sulfatoethylsulfonyl, and the two formula moieties Z are identical to each other or are different from one another,
   or an alkalimetal salt thereof.

6. A compound according to claim 1, of the formula

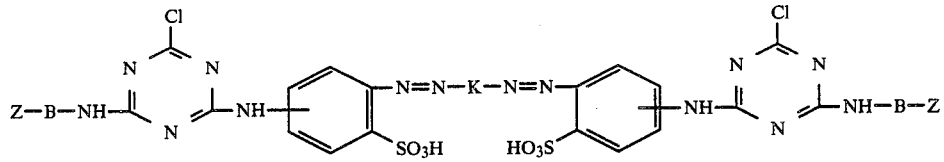

in which
   the two free amino bridges are bonded in meta-position or para-position relative to the azo group,
   B is phenylene unsubstituted or substituted by one sulfo or by one methyl or by one methoxy or by one chlorine or by two methoxy or by one methoxy and one methyl, and the two formula moieties B are identical to each other or different from one another,
   Z is vinylsulfonyl or β-sulfatoethylsulfonyl, and the two formula moieties Z are identical to each other or are different from one another, and
   K is 1-amino-8-hydroxy-3,6-disulfo-naphth-2,7-ylene or 1-amino-8-hydroxy-4,6-disulfo-naphth-2,7-ylene,
   or an alkali metal salt thereof.

7. A disazo compound according to claim 1, in which Z is β-sulfatoethylsulfonyl.

8. A disazo compound according to claim 2, in which Z is β-sulfatoethylsulfonyl.

9. A disazo compound according to claim 3, in which Z is β-sulfatoethylsulfonyl.

10. A disazo compound according to claim 4, in which Z is β-sulfatoethylsulfonyl.

11. A disazo compound according to claim 5, in which Z is β-sulfatoethylsulfonyl.

12. A disazo compound according to claim 5, in which that B bonded to the azo group, is unsubstituted phenylene.

13. A disazo compound according to claim 6, in which that B bonded to the azo group, is unsubstituted phenylene.

* * * * *